(12) United States Patent
Ratti

(10) Patent No.: US 11,548,633 B2
(45) Date of Patent: Jan. 10, 2023

(54) HIGH ENDURANCE UNMANNED AERIAL VEHICLE

(71) Applicant: Jayant Ratti, Atlanta, GA (US)

(72) Inventor: Jayant Ratti, Atlanta, GA (US)

(*) Notice: Subject to any disclaimer, the term of this patent is extended or adjusted under 35 U.S.C. 154(b) by 549 days.

(21) Appl. No.: 16/471,607

(22) PCT Filed: Feb. 28, 2018

(86) PCT No.: PCT/IB2018/051285
§ 371 (c)(1),
(2) Date: Jun. 20, 2019

(87) PCT Pub. No.: WO2018/122830
PCT Pub. Date: Jul. 5, 2018

(65) Prior Publication Data
US 2021/0129983 A1 May 6, 2021

Related U.S. Application Data

(60) Provisional application No. 62/441,163, filed on Dec. 31, 2016.

(51) Int. Cl.
*B64C 39/02* (2006.01)

(52) U.S. Cl.
CPC ...... *B64C 39/024* (2013.01); *B64C 2201/022* (2013.01); *B64C 2201/042* (2013.01); *B64C 2201/126* (2013.01); *B64C 2201/127* (2013.01); *B64C 2201/141* (2013.01); *B64C 2201/162* (2013.01)

(58) Field of Classification Search
CPC ............ B64C 39/024; B64C 2201/022; B64C 2201/024; B64C 2201/042; B64C 2201/20; B64C 2201/126; B64C 2201/127; B64C 2201/141; B64C 2201/162; B64B 1/02; B64B 1/22; B64B 1/24
USPC .......................................................... 244/25
See application file for complete search history.

(56) References Cited

U.S. PATENT DOCUMENTS

| | | | | |
|---|---|---|---|---|
| 3,083,934 A | * | 4/1963 | Vanderlip | B64C 27/20 244/5 |
| 4,685,640 A | * | 8/1987 | Warrington | B64B 1/00 244/23 C |
| 4,889,297 A | * | 12/1989 | Ikeda | B64C 37/02 244/5 |
| 5,071,383 A | * | 12/1991 | Kinoshita | B64D 27/24 446/37 |

(Continued)

*Primary Examiner* — Joshua E Rodden

(57) ABSTRACT

Overall efficiency and/or flight time of UAVs and Drones can be increased by adding elements containing lighter-than-air gasses; and/or by reducing and/or eliminating the power supplied to any combination of the motors to reduce overall power consumption. In an aspect the configuration of a blimp drone include at least one air cavity/chamber/container filled with lighter-than-air gasses. The 3D chambers are made from swept or extruded closed 2D geometry and are detachable from the Drone and can be transparent or camouflaged in color. To maintain control and altitude of the aircraft, lifting surfaces can be incorporated. Such lifting surfaces may include active and/or passive control surfaces to maintain flight stability. Additionally, cavities, fissures, orifices and valves may be added to the surface of the flying vehicle to gain other efficiency advantages.

22 Claims, 14 Drawing Sheets

(56) References Cited

U.S. PATENT DOCUMENTS

| | | | | |
|---|---|---|---|---|
| 7,341,224 | B1 * | 3/2008 | Osann, Jr. | B64C 39/028 |
| | | | | 244/30 |
| 8,448,898 | B1 * | 5/2013 | Frolov | B64D 27/24 |
| | | | | 244/59 |
| 9,650,134 | B2 * | 5/2017 | Chappell | B64D 47/08 |
| 10,246,186 | B1 * | 4/2019 | Beckman | B64C 27/08 |
| 10,486,788 | B2 * | 11/2019 | Piette | H04N 5/232 |
| 10,518,187 | B2 * | 12/2019 | Zima | B64D 47/08 |
| 10,843,784 | B2 * | 11/2020 | Yu | H01M 8/04208 |
| 10,919,610 | B2 * | 2/2021 | Araujo | B64B 1/34 |
| 10,933,966 | B2 * | 3/2021 | Yang | G03B 29/00 |
| 11,104,434 | B2 * | 8/2021 | Guetta | B64B 1/40 |
| 2016/0307448 | A1 * | 10/2016 | Salnikov | A01B 79/005 |
| 2019/0002093 | A1 * | 1/2019 | Muramatsu | B64C 15/02 |
| 2019/0185161 | A1 * | 6/2019 | Eleryan | B64C 29/00 |
| 2020/0062392 | A1 * | 2/2020 | Yoon | G01S 19/015 |

* cited by examiner

HIGH ENDURANCE UNMANNED AERIAL VEHICLE

RELATED APPLICATIONS

This application is a non-provisional application which claims priority to provisional patent application Ser. No. 62/441,163, filed on Dec. 31, 2016.

FIELD OF THE INVENTION

The present disclosure relates generally to Unmanned Aerial Vehicles (UAVs), such as Drones, and more particularly, to efficient and high endurance Unmanned Aerial Vehicles (UAVs), their configurations and aerial applicability thereof.

BACKGROUND

The background description includes information that may be useful in understanding present invention. It is not an admission that any of the information provided herein is prior art or relevant to the presently claimed invention, or that any publication specifically or implicitly referenced is prior art.

An Unmanned Aerial Vehicle (UAV), commonly known as a Drone, is an aircraft without a human pilot aboard. UAVs are components of an Unmanned Aircraft System (UAS) infrastructure; which include a UAV, a ground-based controller, and a system of communications between the two. UAVs may operate with various degrees of autonomy: either under remote control by a human operator and/or autonomously by onboard computers.

Compared to manned aircrafts, UAVs were originally used for missions too "dull, dirty or dangerous" for humans. While they originated mostly in military applications, their use is rapidly expanding to commercial, scientific, recreational, agricultural, and other applications, such as policing, peacekeeping, and surveillance, product deliveries, aerial photography, agriculture, smuggling, and drone racing, among others. Civilian UAVs now vastly outnumber military UAVs, with estimates of over a million sold by 2015, so they can be seen as a commercial prelude to intelligent autonomous artificial beings, with their close cousins being autonomous cars and home robots, among others.

Drones (including remotely controlled toys and related) suffer from short flight times, rendering most of their commercial applications exceedingly impractical, expensive or dangerous; thus making efficiency improvements more than simply important, they are necessary! Similar shortcomings, although less pre-dominant than multi-rotor/mono-rotor vehicles, are also seen on winged aircrafts or wing-rotor hybrid aircrafts/tilt-rotor aircrafts, morphing wing aircrafts and various other species of aircrafts employing wings, rotors or combinations of both. Through the need of hour, came the introduction of using hydrogen (and subsequently Helium) filled blimps; which further got sized down for unmanned/remote operations.

United States Patent Publication U.S. Pat. No. 5,882, 240A filed by Larsen talks about a flying blimp toy that has fins and requires two sheets of inelastic material to form a flange with a shaft and a propeller.

United States Patent Publication U.S. Pat. No. 5,005, 783A filed by Taylor discloses a variable geometry lighter-than-air craft which can change from a buoyant airship to a heavier-than-air craft by changing shape.

United States Patent Publication U.S. Pat. No. 5,906, 335A filed by Thompson talks about a method and apparatus for controlling the flight direction of a blimp using two movable propellers.

United States Patent Publication U.S. Pat. No. 4,931, 028A filed by Hawley, talks about a toy blimp which has infrared circuitry for control and used in remote control applications.

United States Patent Publication U.S. Pat. No. 3,971, 533A by Slater to provide an airship which can be converted from a generally horizontal configuration to a generally vertical configuration by using a slidable mounted gondola.

United States Patent Publication U.S. Pat. No. 4,695, 012A by Lindenbaum describes an aerial load-lifting system including a lighter-than-air unit, such as a blimp, below which is suspended a powered heavier-than-air unit, such as a helicopter. The latter unit produces thrust which can be directed vertically, up or down, or tilted for translational motion in any direction. The units are connected by a flexible tension member such as a cable. The upper, lighter-than-air unit is sufficiently high above the lower, heavier-than-air unit to permit the heavier-than-air-unit to freely control and maneuver itself and the payload suspended below it with minimal restraint from the lighter-than-air units.

United States Patent Publication U.S. Pat. No. 7,156, 342B2 by Heaven et. al. a system for actively controlling the aerostatic lift of an airship by manipulating the ratio of air to lifting gas contained within the airship, and thus the overall mass of the airship by actively compressing and/or decompressing the lifting gas or internal air.

United States Patent Publication US20170038780A1 by Fandetti talks about a drone delivery system using a manned aircraft.

United States Patent Publication U.S. Pat. No. 9,828, 081B1 by Devaul et. al. describes a balloon having an exo-structure comprised of hollow struts or rods and an envelope positioned over the exo-structure.

United States Patent Publication U.S. Pat. No. 6,302, 357B1 by Kalisz talks about a pressure stabilized inflated air transport vehicle for large blimps to carry goods through air.

United States Patent Publication U.S. Pat. No. 6,648, 272B1 by Kothmann talks about an airship with lifting gas like hydrogen or helium with a deck below a gas bag.

United States Patent Publication U.S. Pat. No. 5,285, 986A by Hagenlocher describes a rigid airship with a carrier frame of ribs and beams enclosed by skin sections forming an envelope.

United States Patent Publication US20020106966A1 by Jimenez et. al. conceptualizes a radio-controlled toy blimp with infrared beam weapons for staging a gun battle.

United States Patent Publication U.S. Pat. No. 5,752, 088A by Desselle talk about an aerial photography device which can stay aloft with the use of a relatively small amount of power and with minimal vibration of the camera mount without the need for a tether and can be remotely controlled.

Republic of China Publication CN203094434U by Yu Gang et. al. propose a system with multiple air bags filled with Helium called an airship system for boats to produce a buoyant system in air.

Republic of China Publication CN203094434U by Camp talks about provides a dirigible that adopts hydrogen as buoyancy lift gas and also as fuel with fins for stability.

United States Patent Publication U.S. Pat. No. 9,725, 192B2 by Peyman et. al. describes an aerospace vehicle comprising an airplane or spacecraft, operatively coupled to an airship balloon containing lighter than air gas adapted to elevate the vehicle. A control system adapted to deflate or retract the balloon upon reaching a specific altitude by directing the gas to a propulsion system and high pressure gas chambers for powering the vehicle at a greater speed or to a greater altitude.

Republic of China Publication CN6302357B1 by Zhengyin talks about A variable span wise inflatable buoyant airship integrated, t to achieve a high aerodynamic efficiency, produce large dynamic, easy to control and manipulate, and empty height adjustment achieved in different length by adjusting the wingspan.

Republic of China Publication 204916151U by Camp relates to a technical field airship propulsion systems and more particularly relates to a tilting device.

Republic of China Publication 206476091U by Shenzhen Kai Optical Technology Co. Ltd. talks about an invention to provide an airship, comprising: a hull; and a gas chamber, gas chamber is provided in the interior of the hull; wherein the gas chamber is provided with a plurality of air holes selectively communicating interior and exterior of the gas chamber; with the focus on reducing the air drag on the vehicle during flight.

Republic of China Publication CN206615379U by Zhuang Jinyuan talks about an airship type vehicle, comprising a hull, mounted on the boat body buoyant balloon, a plurality of propulsion propellers is provided with control means and connected to a programmable anemometer of said control means and a plurality of functional units with the actual flight speed; by changing the gas volume within the airbag to adjust the height of floating or flying, it is possible to effectively enhance the stability and safety of the airship.

Republic of China Publication 203567924U by Li Qi extends the previous patent with the beneficial effects that the problems that the inner hanging cable and the auxiliary gas bag cannot coexist and the volume of the auxiliary gas bag is difficult to be effectively measured are solved, the attitude control of the airship is convenient, the structure is simple, and the cost is low.

European Patent Application EP0771729A1 by Carwardine Ian discloses an aerial camera platform signal transmission and reception system is based on an aerostat adapted to hold a load beneath its body. A stabilized camera platform is provided beneath the aerostat for mounting a video camera for angular movement of said video camera about at least rotational axis and for stability against roll and pitch induced motion.

European Patent Application EP0857647A1 by Ockelmann Axel discloses a flying machine cover is held in stable form by internal gas pressure, is stiffened by load straps and has at least one display surface onto which images are projected by an internal projector. The cover material is transparent so that the images projected onto the interior can be seen well from outside. A laser image projector is mounted on one side of the interior of the cover and projects the image onto the inside of the cover on the opposite side. The laser projector is controlled from a gondola mounted on the underside of the flying machine.

European Patent Application EP2875576A1 by Xiao Quan provides a solar power concentration apparatus, a cable like apparatus for power transmission and a method of transmitting energy between different altitudes are provided. By using a unique inflatable structure to concentrate solar energy, it is possible to create a balloon type solar power station to capture solar power above the ground.

European Patent Application EP2125506A2 by Krause Thomas discloses an airship comprising a balloon and several drives for displacing the airship. Said invention can be used by dirigibles that are also known as autonomous airships or blimps, as well as for Zeppelins. The aim of the invention is to provide an airship of the above-mentioned type in which the airship can be prevented to a large extent from oscillating or tilting.

European Patent Application EP2067134A2 by Thiele James R et al relates to an airborne transmission/reception arrays and associated systems and methods are disclosed. An airborne image display device in accordance with one embodiment includes a plurality of electrically interconnected display units, with individual display units including at least one flexible support member mountable to an exterior surface of an airborne device.

European Patent Application EP3013680A1 Egan James C et al provides a hybrid VTOL vehicle having an envelope configured to provide hydrostatic buoyancy, a fuselage attached to the envelope and having at least one pair of wings extending from opposing sides thereof to produce dynamic lift through movement, and a thrust generation device on each wing and configured to rotate with each wing about an axis that is lateral to a longitudinal axis of the envelope to provide vertical takeoff or landing capabilities. Ideally, the envelope provides negative hydrostatic lift to enhance low-speed and on-the-ground stability.

European Patent EP2964526B1 by Wang Ming Yu provides a controller for controlling operation of an unmanned aerial vehicle and a method for controlling operation of an unmanned aerial vehicle, with systems and methods for UAV docking.

European Patent EP2964526B1 by Shi Jun et al provides a method of assisted takeoff of an aerial vehicle. The aerial vehicle may takeoff using a first control scheme and switch to a second control scheme for normal flight when a takeoff threshold is met.

European Patent EP2951460B1 by Benjamin David Polzar discloses a suspension and vibration isolation system comprising cable isolators. The cable isolators employ low-friction air-bearing pneumatic cylinders and cables to isolate a suspended payload from vibrations of a carrier or to isolate the carrier from vibrations of the payload.

European Patent EP2962481B1 by Wang Hongtao et al provides a system for controlling an unmanned aerial vehicle, UAV, said system comprising a monitoring terminal and a controlling terminal, wherein a controlled terminal is typically configured to receive control data from a controlling terminal and to transmit feedback data to a monitoring terminal.

Chinese Patent CN103600831B by Xie Yong et al discloses a blimp balloon to provide a self-forming secondary loss prevention mechanism and inflatable pneumatic method, the liberation of human resources, so that the skin during deployment forces uniform inflation process to avoid the uneven distribution of forces which cause damage.

Chinese Patent CN205293057U by Yu Yaoyu et al provides an airship design of a kind between the semi hard formula and soft between the airship structure, it has advantages such as simple structure, structure weight is little, bearing capacity is strong.

Chinese Patent CN203567924U by Li Qi discloses a novel helium airship bag structure. The novel helium airship bag structure comprises a main gas bag, a hanging rope and an auxiliary gas bag, wherein the main gas bag is connected with a pod at the lower part of a bag body through the hanging rope.

Chinese Patent CN205098460U by Peng Gang discloses an use the multipurpose dirigible of helium for promoting power, including gasbag device, dirigible cabin, the fixed gasbag device that sets up in dirigible cabin top, be provided with the ship wing on the dirigible cabin of gasbag device both sides respectively, ship wing below be provided with electronic propeller, electronic propeller be connected with the battery.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

While many of the aforementioned systems have started combining Helium filled balloons and chambers with payload to product blimps capable of either transporting cargo or act as toys, or carry some payload or act as airships for high altitude travel, none of them touch on the significance and methods of using the said balloons for indoor use for mounting intelligent processing and control to interact with humans or work in place of humans indoors. Additionally none of them talk about ruggedizing the systems to be able to perform outdoor and indoor professional and military applications such as reconnaissance, mapping and more. In addition there is more evidence to suggest that existing flying vehicles can be made higher flight endurance capable, more silent, more rugged and more safe to people and property by the addition of gas filled chambers in or around the vehicles and also by changing certain hardware/aerodynamic designs for the vehicles.

SUMMARY

The present disclosure relates generally to Unmanned Aerial Vehicles (UAVs), such as drones, and more particularly, to efficient and high endurance Unmanned Aerial Vehicles (UAVs), their configurations and aerial applicability thereof.

Aspects of the present disclosure relates to efficient and high endurance Unmanned Aerial Vehicles (UAVs), their configurations and aerial applicability thereof.

In order to solve at least the above recited issues in the prior-art, overall efficiency and/or flight time may be increased by adding elements containing lighter-than-air gasses; and/or by reducing and/or eliminating the power supplied to any combination of the motors to reduce overall power consumption. To maintain control and altitude of the aircraft, lifting surfaces can be incorporated. Such lifting surfaces may include active and/or passive control surfaces to maintain flight stability.

An aspect of the present disclosure relates to a maneuvering system (interchangeably hereafter referred to as "blimp drone" or "flying balloon" or "Bubble") and a method of obtaining such maneuvering system.

In an aspect the configuration of a blimp drone comprises at least one air cavity/chamber/container filled with lighter-than-air gas. The lighter-than-air gas can include but are not limited to hydrogen, helium, or any combinations thereof or other gasses, with the net end result being the mixture is lighter than the density of air at the same surrounding temperature and pressure. Air could be that on earth or in a space-ship or extra-terrestrial and may not have the same composition as the air on Earth.

In an aspect, the blimp drone can have at least one propulsion mechanism. In an exemplary aspect, the propulsion mechanism can have 2 or 3 or 4 propellers or more, or even 1 propeller on a servo mechanism to steer the propeller, or flapping wings, or compressed gas, or laser based, ionic, combustible-fuel based or other propulsion mechanisms. It may be appreciated that, the propulsion mechanism discussion or claim on what specifications of the propulsion mechanism is beyond the scope of this disclosure and hence is not claimed.

In an aspect, the blimp drone can include control systems to fly it either autonomously or steered from the ground using wireless/tether-control etc.

In an aspect, the blimp drone can include at least a power source. In an exemplary aspect, the power source can be an onboard power source or a tethered power-source or an off-board power source like a directed laser, magnetic, RF etc., or even atmospheric, where in the power is captured through wind/thermals, solar, and/or other natural or artificially occurring sources.

An aspect of the present disclosure relates to a robotic system. The robotic system include an Unmanned Aerial Vehicle (UAV) having at least one gas chamber adapted to hold a gas for buoyancy purposes to reduce the net effective Gross Take Off Weight of the UAV, a propulsion system of the UAV comprising any or combination of fixed wings, flapping wings, and rotary blades, and propellers, and a payload comprising at least an electronic control system to maneuver or pilot the UAV.

The robotic system also include at least a power source either onboard in the form of stored power onboard such as a battery or fuel, or has a power gathering source such as a solar panel or wind energy generator, or has a power delivery source such as a tether cable, wireless energy transfer through EM radiation or combination of any of the above mentioned power source.

The robotic system includes a communication system to communicate with the UAV to exchange data and instructions.

An aspect of the present disclosure relates to an Unmanned Aerial Vehicle (UAV) having at least one surface exposed to external air is laden with cavities holes or vents or valves, wherein the surface of the Vehicle has air moving relative to the surface, and the air moving over the vehicle surface causes differential pressures and velocities across the inside of the surface and the outside of the surface.

As compared to the conventional drone devices, the use of helium, hydrogen, or other lighter than air gas filled balloons, containers or elements which can increase the flight time and minimize power consumption to keep the aerial vehicle afloat in air. The air filled balloons or blimps can be added to other ordinary drones and vehicles to make them lighter to achieve longer flight endurance as well. The use of a blimp or balloon can further safeguard, to some extent, against bumping into people or objects or structure and may reduce damage in case of crash or emergency landing. They additionally may be safer to operate around habitable environments with people or sensitive/expensive equipment or objects around.

Another aspect of the said bubble is the fact that it can minimize its operating/propulsion noise due to the lower demand on propulsion power (achieved by minimizing the Gross Take Off Weight (GTOW) from the use of lighter than air gasses); as a result, as well the total heat generated by the propulsion system is minimized, making the drone less visible to heat detection devices like thermal imagers.

Another feature of the Bubble drone is that it has a customizable body shape to conform to the mission at hand. For example, while operating outdoors, the shape can be kept streamlined such as an ellipsoidal shape, similar to an American football. While indoors, the shape can be kept such that it's symmetric from all directions for omnidirectional usage or simply aesthetics. For example a donut shape (or a toroidal shape) would give it symmetry and also aid in VTOL (essentially a 360 degree swept closed form such as a rectangle, circle, ellipse or other complex Two Dimensional (2D) closed patterns).

Another feature is the ability for the drone is the ability to float on water and not sink, owing to the gas filled chambers onboard.

As compared, blimps are ideal for any application fit for a quadcopter, helicopter but with the added advantage of endurance, low noise, and safety. Such applications can include but are not limited to: security—patrolling and monitoring, environment mapping, 3d environment scanning and digital/virtual re-construction, navigation, infrastructure inspections/monitoring, aerial photography, aerial videos, mail-delivery (or packages delivery), multi-player or single-player gaming (sports, racing, battles and more), telepresence/VR, toys, games, recreational gadgets, search and rescue, disaster-relief, exploration/scouting, disaster management—quickly gather information/monitor a disaster area, storm tracking/forecasting, weather-predicting, forest preservation—monitor hiking trails, poachers, land, forest fires, maintenance, security etc, food/beverage delivery, internet providing, by acting as "dots" or "stand-alone" hotspots, nodes in a network, mobile security and replacement of CCTV camera based security/monitoring, aerial bartenders/waiters at restaurants/eating places, pollution-fighting (by air filtration, deploying chemicals etc. in air), selfie applications to capture person(s) by camera, news gathering for tv/print/online news and events, journalism, aerial music streaming, broadcasting applications, for example aerial sound speakers, mine detection/metal detection/chemical detection/radiation detection and other similar apps, performing drones, where single or multiple drones perform aerial stunts, maneuvers for entertainment, emergency response drones for medication delivery, medical emergencies, aerial weaponry including flying guns, artillery and other weapons, hydrogen powered aerial applications, where the blimp can also act to increase buoyancy of vehicle, tree-planting applications, crop inspection, orchard inspection, grown food, agriculture inspections, plant/tree inspections, pestilence detection, countermeasures, disease detection, countermeasures, solar energy generation by including solar films/panels on the flying balloon, blimp, drone, advertising in air, space-shuttle, space-station applications for security, monitoring etc, inter-stellar and planetary exploration, mapping, scanning, real-estate and terrestrial photography, mapping etc, aircraft, bridge, vehicle, land, building, pipes, rail-lines, wiring, coast, etc—inspection and reporting, immersive flying applications (with the aid of VR headsets or 3D Televisions, holograms etc) through aerial video, lifeguards at lakes, beaches, swimming pools etc., and virtual 3D/temporary structures, statues, formations etc.

It may be appreciated that, many more applications are possible by the use of blimps or lighter-than-air gas filled vehicles, or by adding containers filled with these gasses, to tangible objects. However, our main purpose is to focus a new kind of drone that has on-board lighter than air gasses for the purpose of buoyancy, increasing payload, flight endurance etc. with emphasis on indoor flight/close-quarter flight or flight through dense environments.

Another feature of the blimp drone so presented herein is its ability to camouflage with its surroundings, i.e. blend in with the surroundings to offer minimum visual distraction, detection etc. For example the use of a see-through balloon or gas cavity the visual footprint of the drone can be substantially decreased; by painting the balloon or gas cavities with camo colors or sky blue colors etc, it's visual presence/detection is minimized.

It may be appreciated that, companies or individuals looking to apply drones to the above applications but with the added benefit of increased endurance, safety, and lower noise. Such companies include but not limited to warehouse management, office management, land management, infrastructure inspections, agriculture management, photography/video creation, toy makers, search and rescue, forest surveys and more.

It may be appreciated that, businesses looking to automate the tasks of security, environment mapping, navigation, inspections, search and rescue, exploration, environment scanning, weather analysis, and surveying. Businesses looking for a method to take aerial photography/videos, develop toys, and create a telepresence/VR experience which is enhanced by a stable platform that can move freely through the air.

The present invention can be of interest for most of drone manufacturers selected form but are not limited to, DJI (China), 3DR (USA), Parrot (France), Hubsan (China), Blade (USA), UDIRC (China), JJRC (China), Syma (China), Walkera (China), Cheerson (China), Hobbico (USA), Yuneec (China), since, none of the above makers of drones had commercial blimp based drones.

As compared to the existing drones, the blimp drone has following characteristic: (note the term quadcopter is used interchangeably with multi-rotor vehicles in general, capable of VTOL)

Lower energy requirements compared to a quadcopter.
Higher endurance over a quadcopter.
Lower generated noise over a quadcopter.
Smaller storage requirements compared to a quadcopter. Can be deflated and folded up.
Much more stable than a quadcopter leading to cleaner video/images/scans.
Minimal requirement for sensors and control systems, computing towards flight stability, since the blimps are passively stable.
More robust. If the power reserve elapsed or system failed, the system would not fall out of the air.
Undamaged by bumping into objects (depending on material of blimp and sharpness of external object)
Ubiquitous—suitable for a large range of applications and nearly all applications than conventional drones and robots are able to accomplish.

The proposed invention may be used by companies looking for a stable platform for video/photography/scanning with lower background noise, or firm that handle aerial photography/video for events such as weddings where the noise of a quadcopter is undesired, or companies looking for a low powered option for applications which have power supply limits, or companies looking for a platform that has higher endurance than a quadcopter leading to longer, farther flights, or search and rescue, environment mapping, exploration, navigation, and security are examples of applications where higher endurance gives the blimp an advantage, or individuals or companies that sell different kinds of drones to end users or to other businesses.

The proposed invention perceives sophistication compared to a quadcopter. People see a dynamic quadcopter to be smart and more advanced, graceful, mature and sophisticated; since adding a lighter than air balloon or container to a system makes it more air resistant, slower, less dynamic.

It may be appreciated that, as compared to the convention drones, the present invention enables to create a platform for attaching multiple types of cameras, 3D scanners, sensors. Add overall polish to the design. Remove possible barriers. A mechanism that makes the process of filling the balloon with helium easier. Filling of gas and it's techniques thereof are not within the scope of this patent.

Various objects, features, aspects and advantages of the inventive subject matter will become more apparent from the following detailed description of preferred embodiments, along with the accompanying drawing figures in which like numerals represent like components.

In addition more embodiments using other means of providing lift and improving endurance is explored.

BRIEF DESCRIPTION OF DRAWINGS

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings.

DETAILED DESCRIPTION OF THE IMAGES

Figure 1:
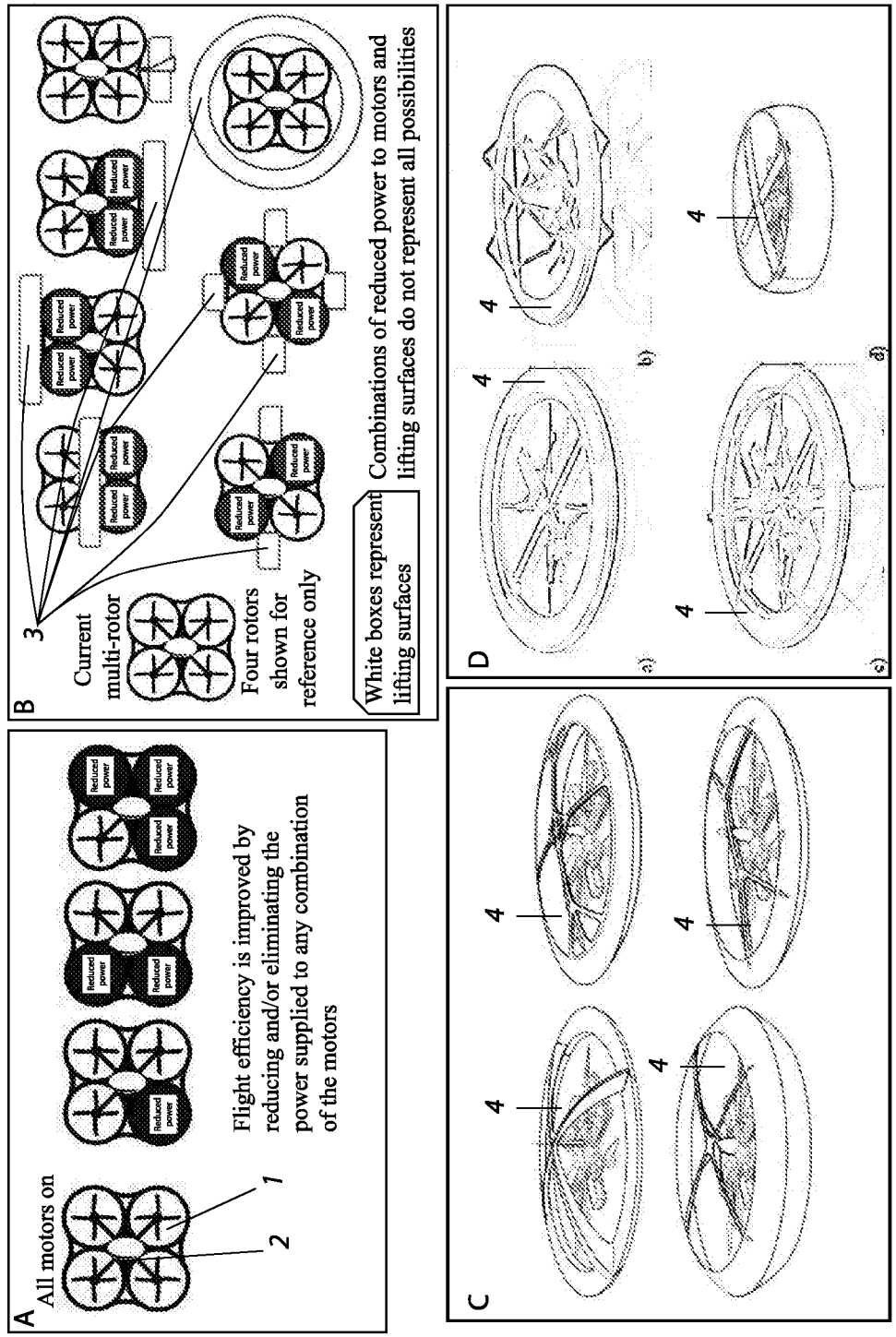
FIG. 1 illustrates exemplary propulsion and lift creating surfaces of drones, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art.

The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In our day and age the use of drones and UAVs has increased multifold and yet their basic limitations are still a subject of much research. At present the onboard power consumption is enormous due to the large propulsion energy required to take-off, land and cruise. Additionally, with the miniaturization of electronics, the onboard payload for these vehicles has been increasing in processing power and power demand on the power supply/energy storage. The use of drones is going to aid in numerous applications both indoors and outdoors; from fire-fighting to search & rescue, to wildlife preservation, homeland security, package delivery, to home security and interactive hobby/toys, among others. Hence, the need of the hour is the maximization and enhancement of flight endurance so these Drones are able to complete their tasks efficiently.

The dangers of drones is also vastly apparent with massive liability towards the lives of humans and property: drones have occasionally fallen out of the sky after power failure, on-board system failure, battery drain, environmental calamity and more. The cost of such a failure is seen in news often and the various agencies such as FAA tightening their grip on the freedom of use of drones for the purpose. The need of the hour is also to promote safety of drones and in general safety of working around (in the same environment with drones).

Figure 11:
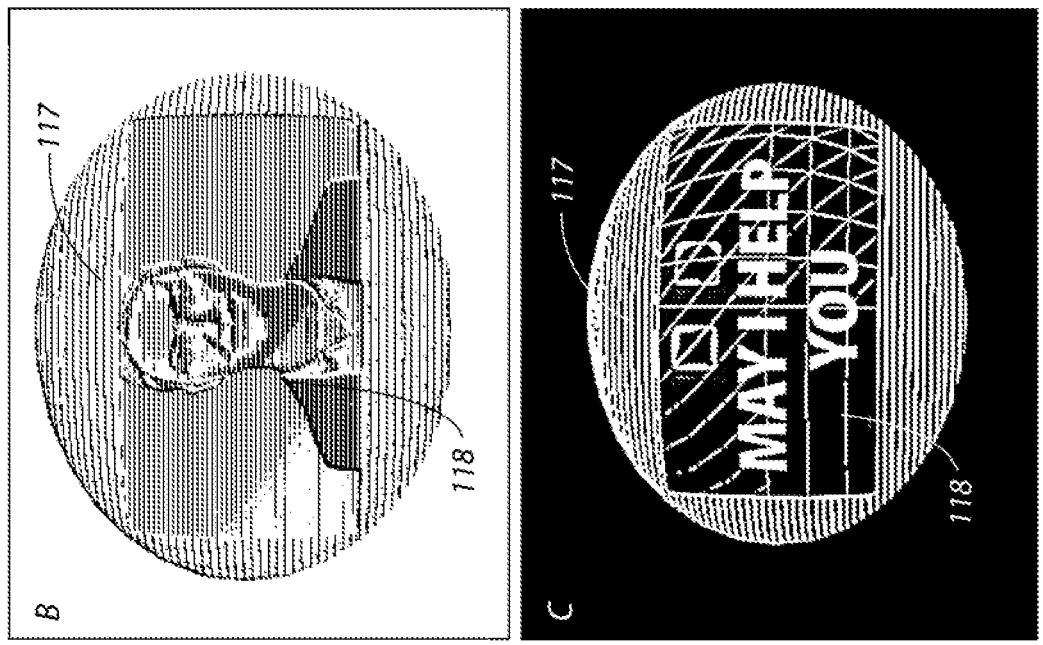
FIG. 11 illustrates an embodiment of the vehicle such that an internal projector is added to the blimp drone to project displays on the body of the blimp as seen from outside.
Figure 11:
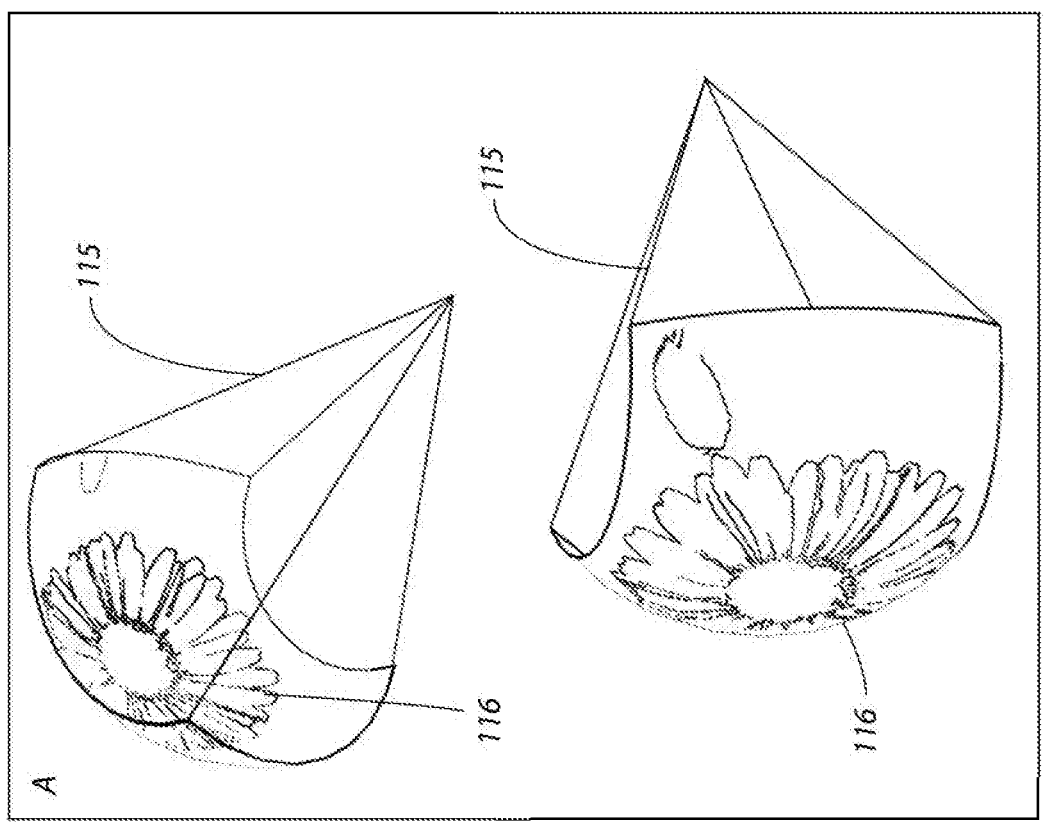

FIG. 1 illustrates exemplary propulsion and lift creating surfaces of drones, in accordance with an embodiment of the present disclosure. The surface 1 is added at various positions on the drones. In case of Sub figure B, it is seen added at positions 3 and in sub figures C and D it is shown added in FIG. 4. It is also noted that when the lifting surfaces are added to a conventional quad coper, then the lift of the individual propellers can be reeducated such as shown in Figure A, and also shown in Figure B. The forms 4 are freely rotating disc surfaces which provide lift and are usually in spinning motion. FIG. D (a) shows a conventional quad copter in the middle and the disc supported by it around it through a mechanism. The (b) and (c) figures also show the same but mounted to the central quadcopter through a different scheme (note the quadcopter can easily be a single propeller copter, a twin copter, a tricopter or multiple other multi-rotor vehicles. The figure (d) inside Figure D is the case when the disc is such that the disc provides lifting force when the quadcopter turns close to perpendicular to the ground and is moving forward. It may be appreciated that various configurations of multi-rotor and winged aircrafts is possible, some of the possibilities. Further, it may be also appreciated that there are various aerodynamic advantages of spinning lifting surfaces, such as but not limited to, stabilize the spinning structure due to gyroscopic inertia, can be shaped such that the spinning structure aids the aerodynamics of the flying vehicle by acting as a flying disc, there by adding both gyroscopic stability and also providing aerodynamic lift to the flying vehicle, helping to conserve power in flight and during Cross winds. Advantage of a circular disc is also the ability to harness/leverage cross-winds since it is symmetric along the central radial axis. Figure also illustrates various designs of multi-rotor drones or aerial vehicles, with an aerodynamic frame, in accordance with an embodiment of the present disclosure. It may be appreciated that there can be various ways of mounting the LEDs on the flying vehicle. FIG. 11 illustrates the various implementations of the aerodynamic lift improvement: a) a gimbaled spinning structure, b) a spinning disc, c) a spinning shell, d) a spinning drum, in accordance with an embodiment of the present disclosure.

Figure 2:
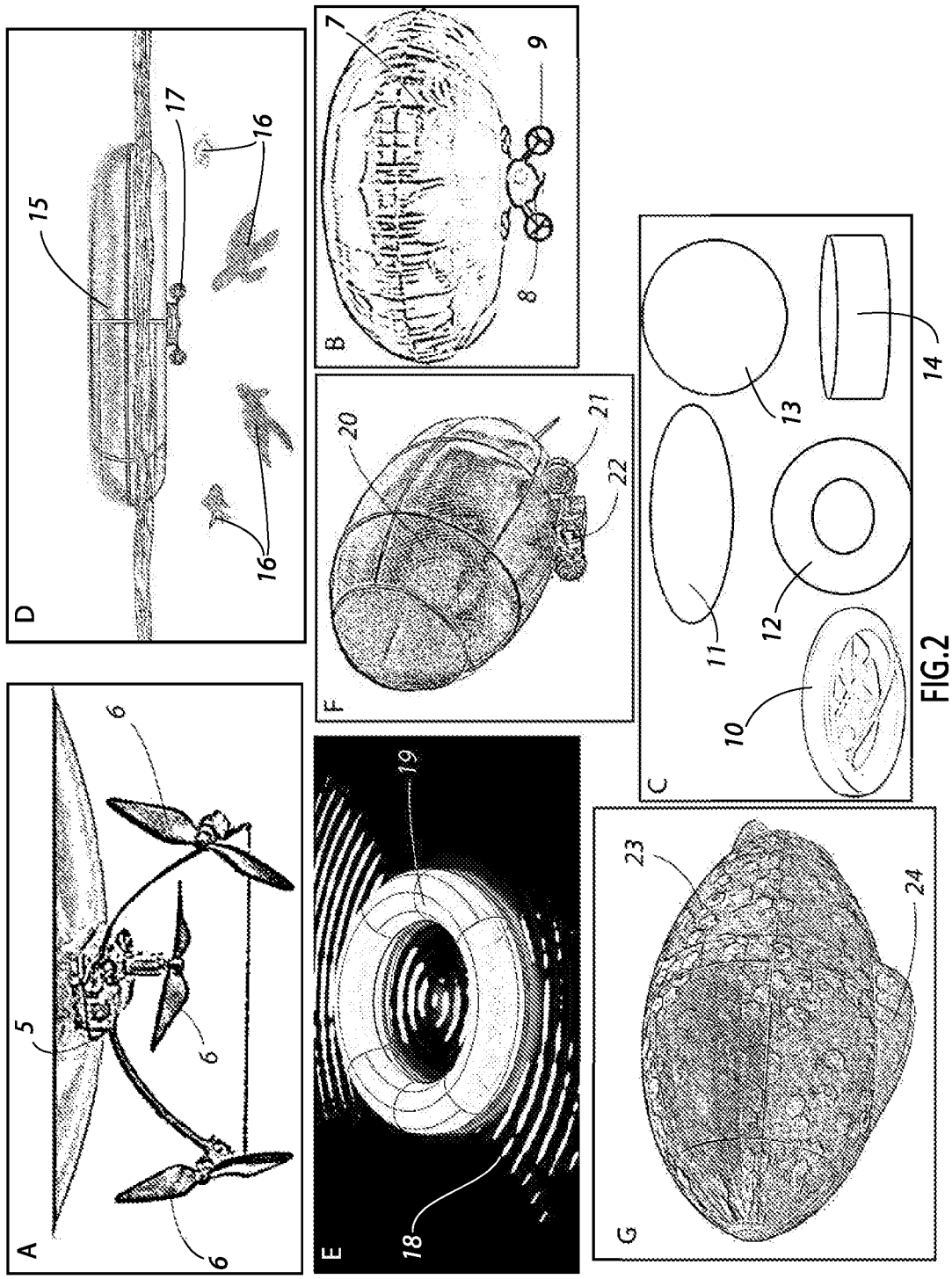
FIG. 2 illustrates exemplary various shapes of the blimps or balloons or gas-filled members, in accordance with an embodiment of the present disclosure.

FIG. 2 illustrates exemplary various shapes of the blimps or balloons or gas-filled members, in accordance with an embodiment of the present disclosure. The blimp or the balloon or the gas containing chamber can have various shapes as well as long as the gas is lighter than air. A blimp drone may be referred to as a flying balloon or blimp through this document as well, but should be inferred as a blimp. Similarly drones without explicit balloon like shaped or appendages may have cavities or chambers that can host the lighter-than-air gasses and may be referenced as a blimp or a blimp drone as well in this disclosure. Figure shows various blimp shapes and sizes. Figure A shows a tri propeller configuration wherein the center propeller is used for Vertical motion. The Left and Right propellers are used for forward, backward, turning and yawing motions. The configuration doesn't allow for rolling motion. The figure B shows another configuration having only two propellers 9, which are moved by the use of a servo mechanism to provide all basic motions of the vehicle. 5 and 8 show the placement of the control system electronics payload. 7 show the gas chamber. Figure C shows various 2D geometric forms that are swept or extruded to form various shapes of the gas chamber (alternatively called balloons). Figure D and E show the swept ring shape of the gas chamber or balloon. The propeller 17 are in this case amphibious wherein they are unaffected by the water; however, they can be specialized to be native to submerged propulsion if the application requires more of that. The tubular configuration is not the only shape to be water operable. All gas chambers/balloons are able to float on water surface The floating on the surface of water enables the drone to have a unique trait in being agnostic to its site of landing and take-off, giving the blimp style drones to have a significant edge over other drones. Additionally, the drone can land on any surface and conserve power. The configurations F and G are more traditional capsule shaped profiles which are commonly seen in American Football or the shape that of capsules. The front part of them is hardened to sustain a head on impact. Additionally, the F design has solar film embedded on its surface to enable ambient light/solar charging during operation or during rest. 22 is the control system payload and 21 are the propellers for motion. 24 is an encapsulated configuration to guard against external objects such as tree leaves, dust, debris in air etc. Figure G is further camouflaged to blend with a forest setting for covert/military applications. The tail of G is shown to have small fins, used to stabilize the vehicle in wind and have it naturally align headlong against the direction of the wind to minimize air drag. One important consideration is also the fact that the outer coverings of F and G configuration could be installed over the gas chambers to provide for various applications (for instance a camouflaged outer covering is shown in Figure G and a solar cell blanket is shown in Figure F. Alternatively other colors, water proofing, etc coverings can be added as well.

Figure 3A:
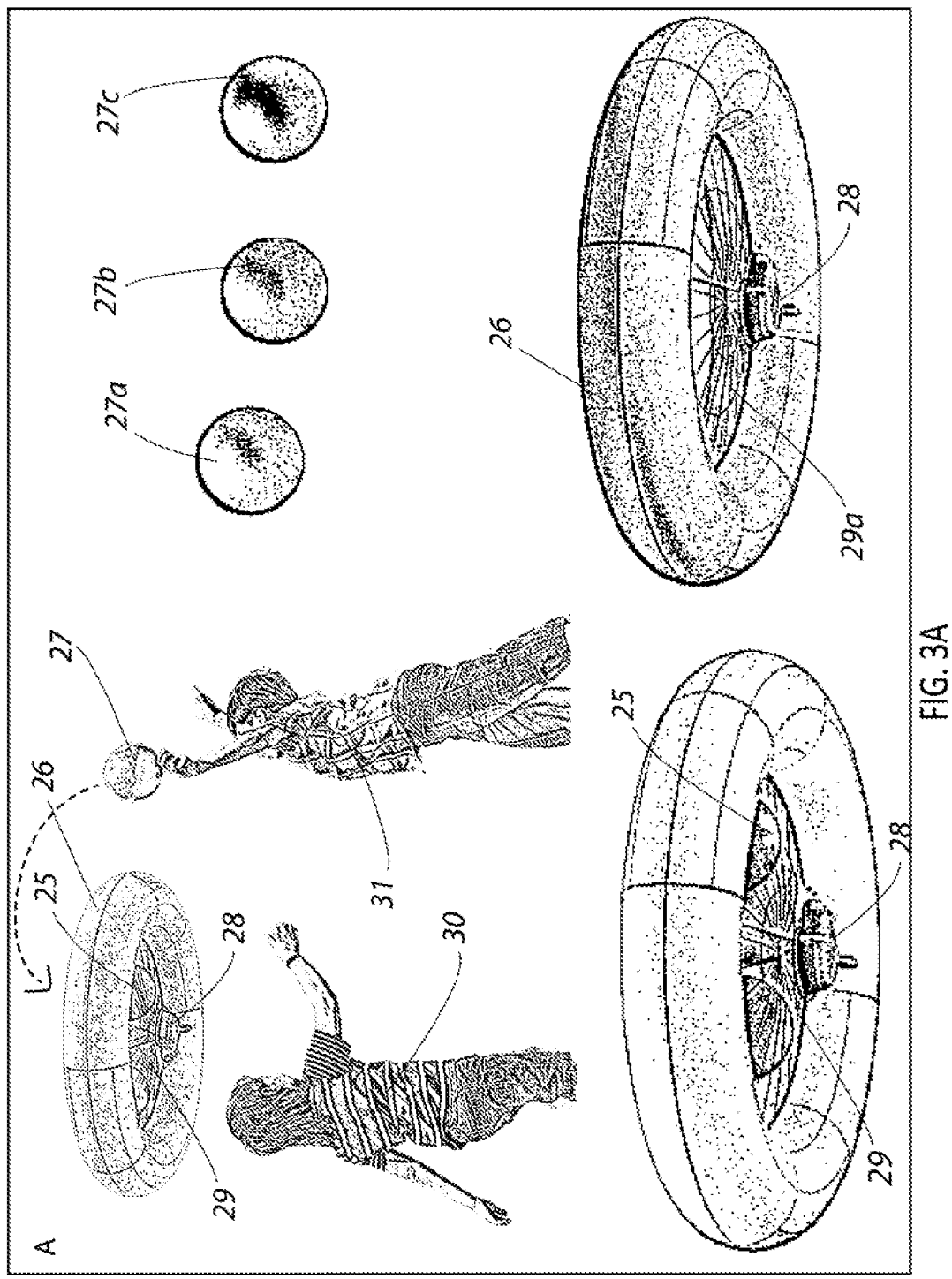
FIG. 3A illustrates an exemplary shape of the blimp drone where in the hollow chamber is a donut style or toroidal ring with an example application of Air Basketball.

FIG. 3A illustrates an exemplary shape of the blimp drone where in the hollow chamber is a donut style or toroidal ring with an example application of Air Basketball. FIG. 3A shows a tubular gas chamber (or toroidal shape or donut shape) gas chamber, within it the inner void of the tubular gas chamber has a breathable net or mesh it can be used to catch objects which land in the void, such as basketball in a ring. Note the advantages of the tubular ring is the fact that it can allow air to pass through the center, hence a drone that has the tube around it can function similar to how it operates without it, but gains the added benefit of protection from all sides, water landing (floats on water), safeguards the people and property from the drone's hardware and spinning propellers, impact absorption. The tube filled with lighter than air gas produces a net lift on the vehicle, reducing its GTOW and reduces power consumption and increases flight endurance. 27 show a soft foam ball that acts in this case as the basketball and can be thrown into the tube to score a point, when used as an air-basketball game. The players 30 and 31 play the game together, wherein 30 controls the basket and 31 throw the ball. The drone can easily also fly autonomously and substitute 30 for flight controls. Additionally 31 can be substituted as well and another autonomous drone or sling can try to score a point by landing the ball inside the basket. Another caveat to the game could be that as more balls 27 are landed in the basket, the drone gets heavier, thereby expending more power and finally unable to sustain flight, awarding 31 with a win. The player who sinks the other player's air drone sooner would win. 29 shows the mesh that ties the inner void of the drone and 28 shows the propulsion system which lies below the mesh. The Mesh also prevents the balls from touching the blades of the drone. The air basket ball shown in Figure A can have various other embodiments, wherein teams of players can play together and try to sink the opposing team's air ships (baskets) by launching ball like projectiles to land in the baskets; while the defending team prevents such from happening. Other more fun embodiments are also possible. So this can provide constant entertainment in various ways. Computer vision through the use of cameras on the drone can add another degree of intelligence to the drones as well for more applications.

Figure 3B:
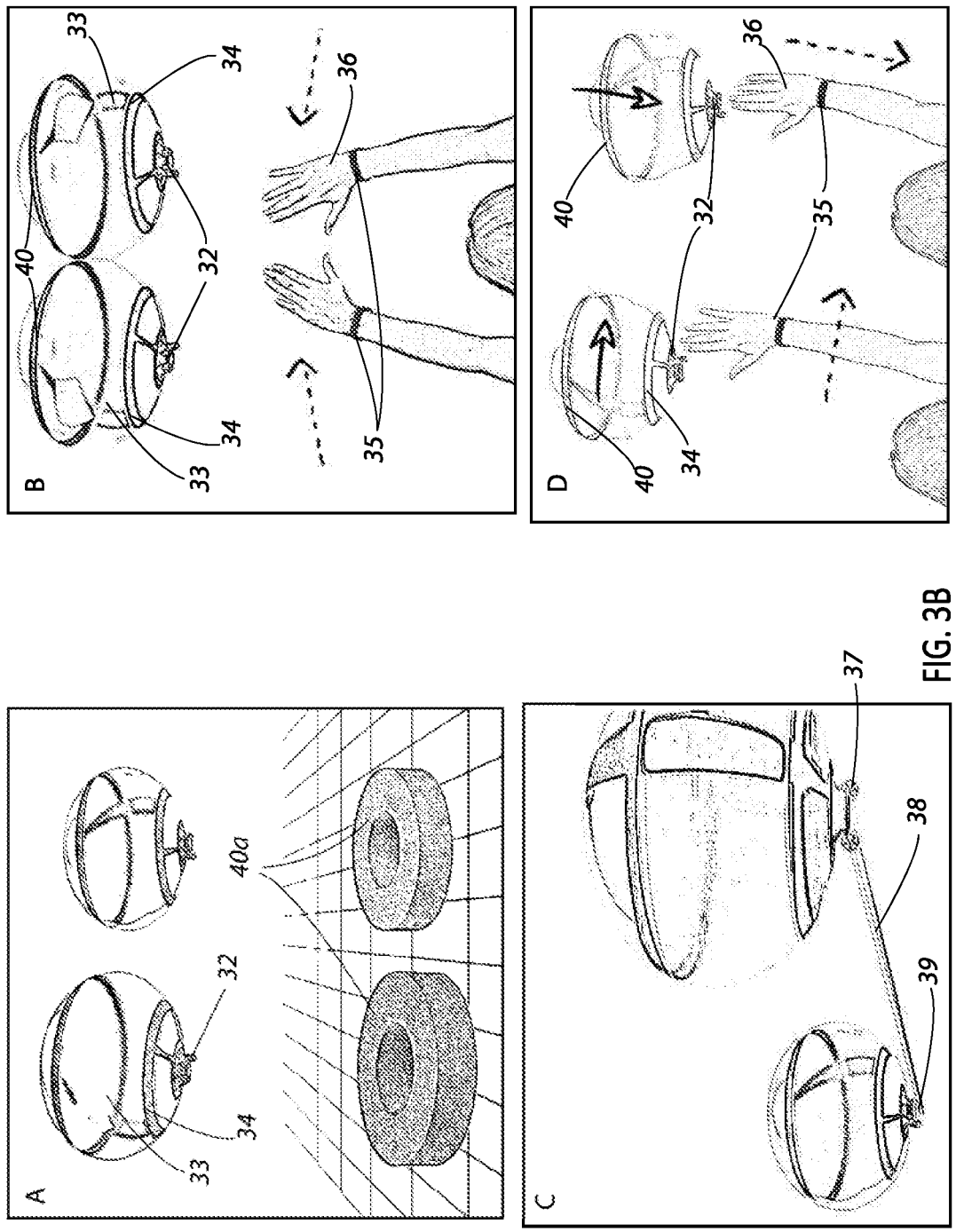
FIG. 3B illustrates an exemplary configuration of the blimp drone wherein the drone responds to human gestures and used in games.

FIG. 3B illustrates an exemplary configuration of the blimp drone wherein the drone responds to human gestures and used in games. FIG. 3B shows another embodiment of the drone wherein the gas chamber is transparent, which can also glow from within or have luminescence added within. The drones are now controlled with the use of motion gestures. The motion gestures are either visually seen by the drone having computer vision or are motion sensing bands or wands or remotes etc that allow the drone to move to correspond to a similar motion of the gesture. In Figure A, two people towards playing a game called capture the flag, where in objects on the field have to be made contact with fastest for the player to win. Additionally could also include landing or dropping an object within the circles on the ground 40*a*. In Figure D, the two drones are operated separately by two people and they are playing the game of TAG, wherein one player is trying to tag the other and score points. In Figure C, the two drones have Infrared (IR) or lasers added to them. One of them has to fire on the other drone and score points. Similar to the game called "laser tagging" or Paintball. In Figure B, the person is collaborating the flight of two drones together using two bands.

Figure 4:
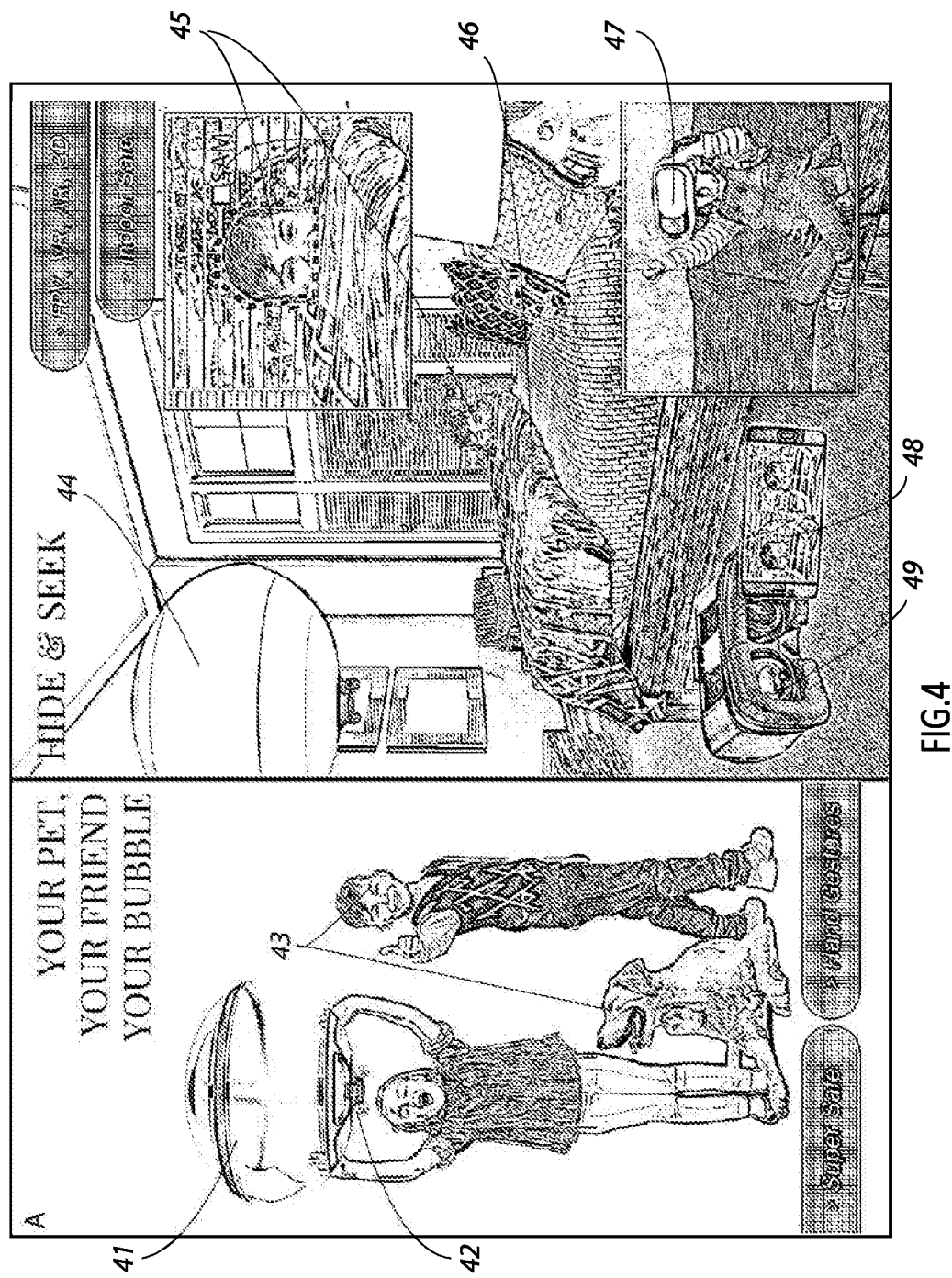
FIG. 4 illustrates an exemplary configuration of the proposed blimps with drone, referred to as "BUBBLE" which is safe and used for telepresence.

FIG. 4 illustrates an exemplary configuration of the proposed blimps with drone, referred to as "BUBBLE" which is safe and used for telepresence. FIG. 4 shows the vehicle in the picture is embedded with 3D cameras enabling the feeling of telepresence. Alternatively through a split screen view in a VR headsets of a monocular camera. This can be an entertaining game as well called 'Hide & Seek' but in this case the person hiding 45 is trying to escape being captured on camera and the drone 44 is being controlled by the Seeker 47. The seeker is using a virtual reality headset or another display device to see video from the Drone's view. 45 are hiding behind the bed 46 in this scenario. The figure A shows the drone and people 43 and 42 using the same space and co-existing safely.

Figure 5:
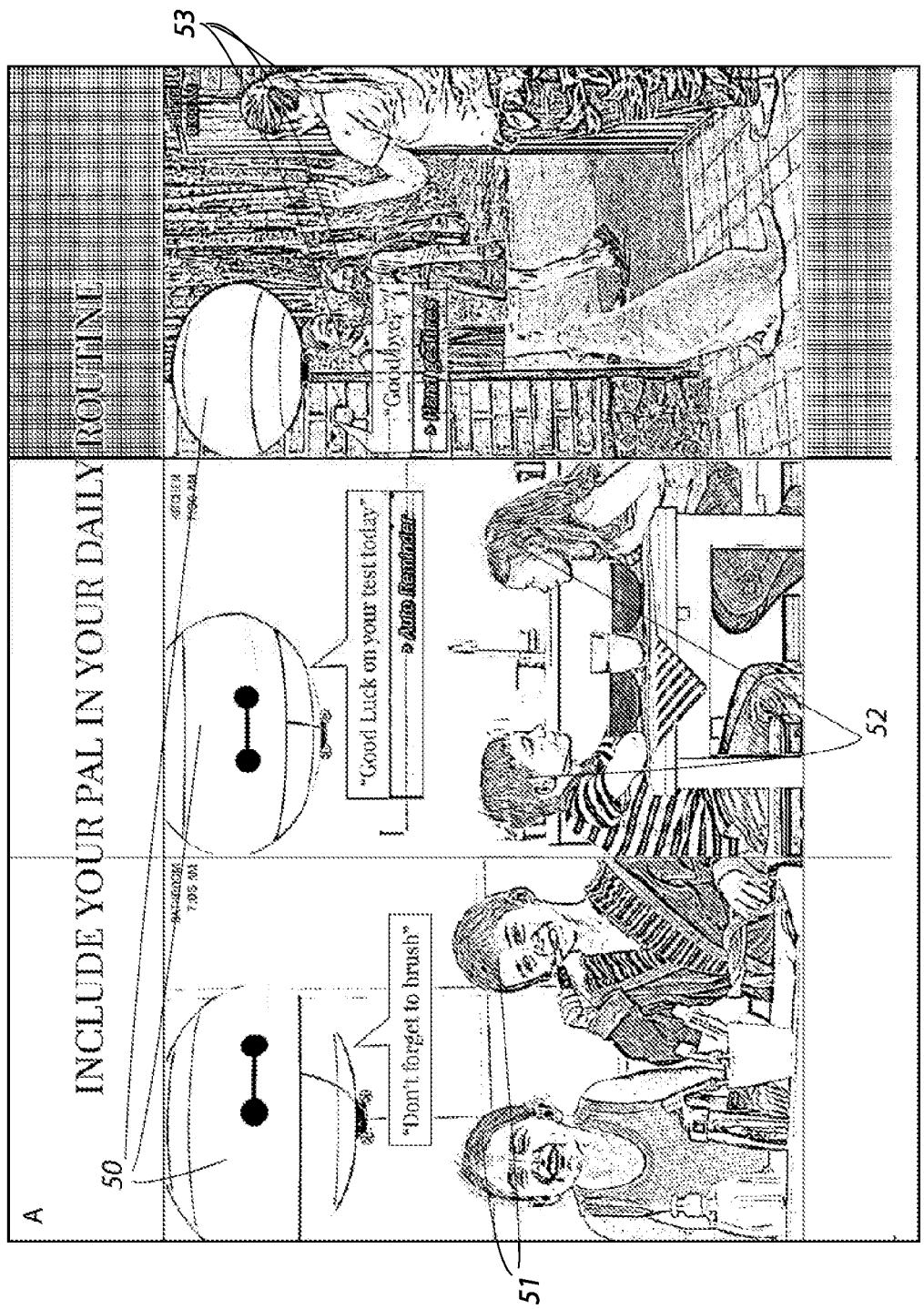
FIG. 5 shows the BUBBLE drone in various times and settings in a home.

FIG. 5 shows the BUBBLE drone in various times and settings in a home. FIG. 5 provides a daily routing in a home where kids are getting ready for school 51 and the drone 50 is playing with them by interacting with them or reminding them of daily chores to do at set schedules. In the center picture it's wishing them Good Luck while they are at their breakfast table. In the last picture the drone 50 is scheduled and visually active to interact with them, in this case wishing them Goodbye.

Figure 6:
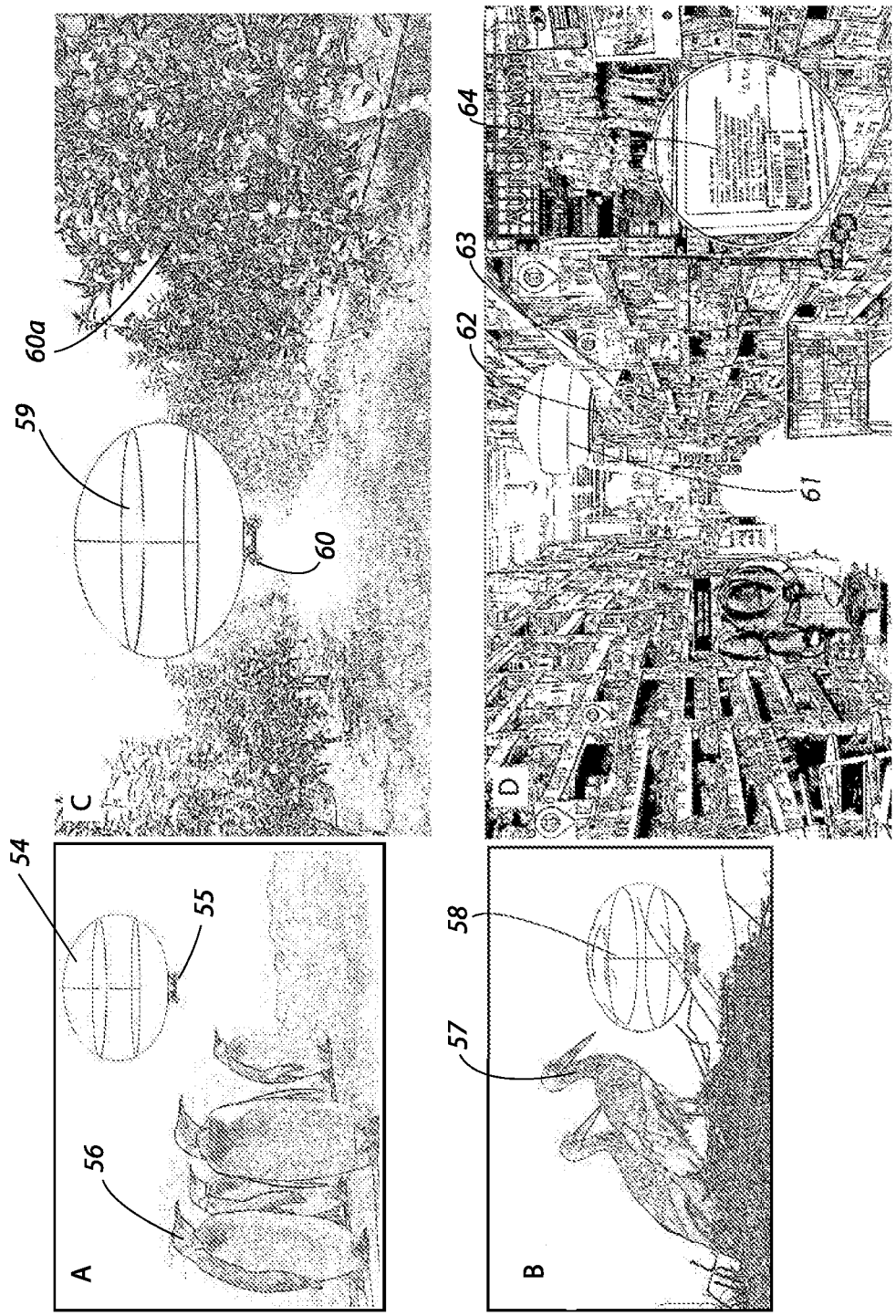
FIG. 6 shows the BUBBLE blimp drone or HUBBLE used outdoors for monitoring in professional monitoring applications.

FIG. 6 shows the BUBBLE blimp drone or HUBBLE used outdoors for monitoring in professional monitoring applications. FIG. 6 shows outdoor applications of another variable of the Blimp or the Balloon, called the Hubble. Hubble is termed for distinguishing it from the indoor scenario, wherein it is called the Bubble. The drone 54, 58 is monitoring wildlife quietly; this is possible the fact that the drone is able to fly quietly and is safer to be around. The drone has higher endurance hence it flies longer, allowing the wildlife 57 to get used to the drone while in its proximity. The other feature of notice is that the Hubble is transparent in nature, allowing for a soft appearance with good camouflage as well. In the scenario shown in figure C, it is shown that the blimp is moving through an orchard. Again, the ability to maneuver with long endurance and quietly enables the use of the drone for crop and vegetation monitoring applications, even within nurseries or flower beds, without hurting the flora. In the impression in Figure D, the drone 61 is moving through the aisles of a warehouse trying to locate products, 63 using cameras. The zoomed image is shown in 64 of the object of interest; here again, the situation is possible since the Bubble is able to maintain long loiter/hovering times and is rugged enough to sustain bumps, impacts, pokes and hits from stationary or moving parts around it in the warehouse. Such can also apply to scenarios involving shopping isles and others.

Figure 7A:
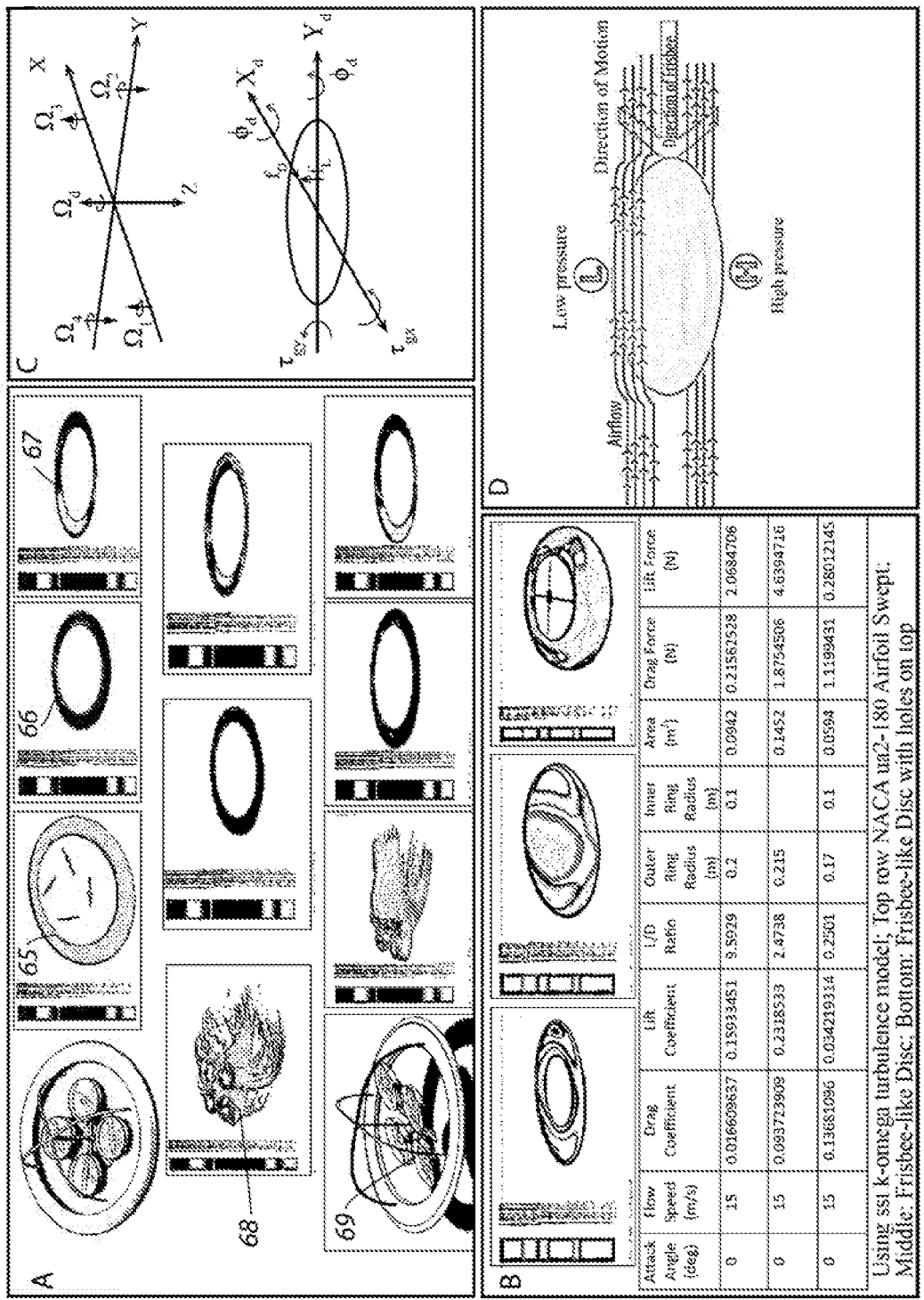
FIG. 7A shows various styles of flying discs that can be used replacements for the gas chamber.

FIG. 7A shows various styles of flying discs that can be used replacements for the gas chamber. In FIG. 7A the illustrations are essentially showing the aerodynamic performance of the disc around the central propulsion mechanism. The disc and the aerodynamic rings 65, 66, 67, 69 shows the flow of air around them to provide lifting force. The general concept applies for the ring as well wherein the top surface of the ring allows for a longer travel path for the air and the separation is allowed to reconverge but causing an area of low pressure or high velocity over the surface of the disc. 69 show the ring around the propellers and held to the chassis through the means of a cage.

Figure 7B:
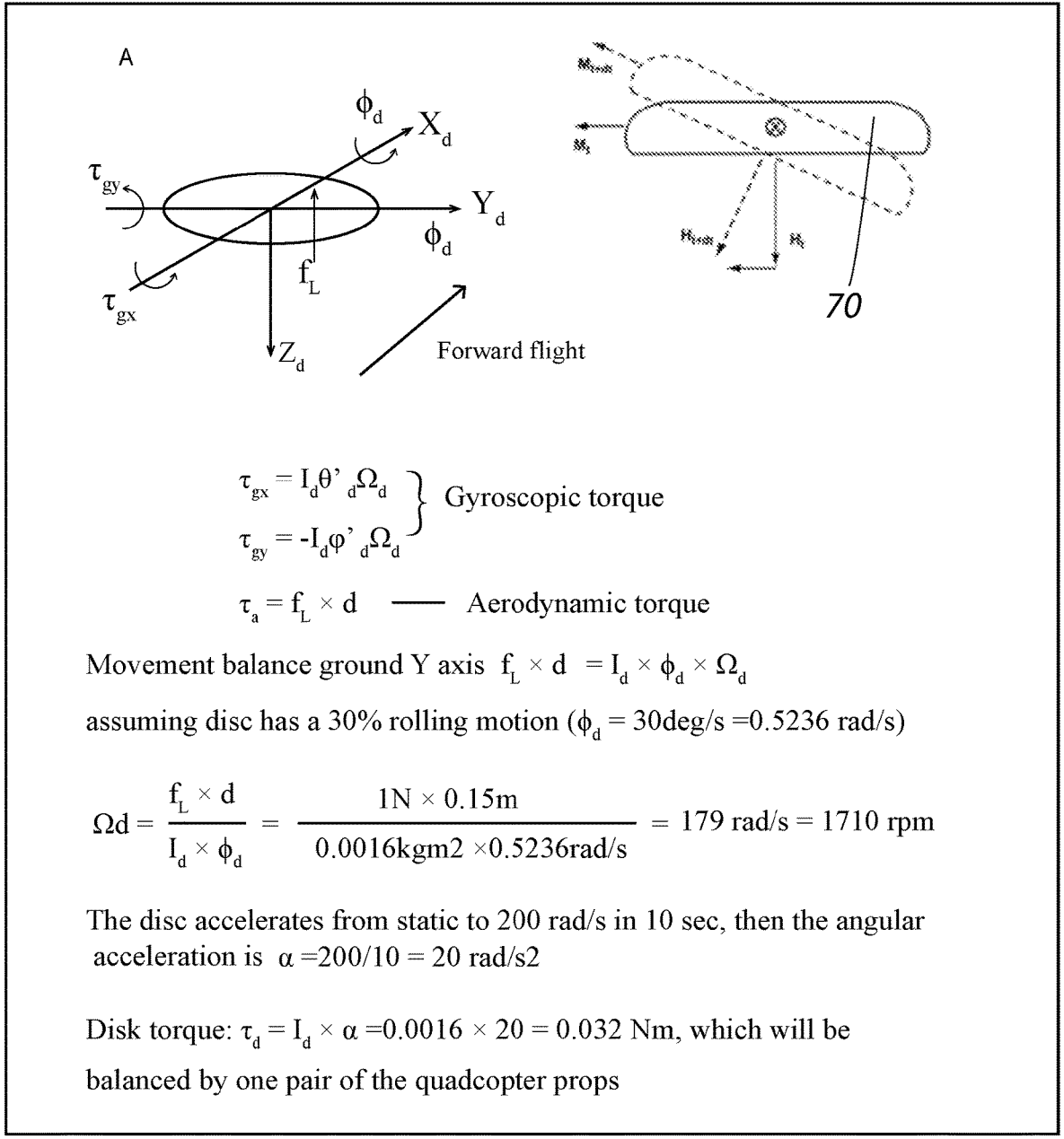
FIG. 7B shows describes graphically the mathematical dynamics of a flying Disc.

FIG. 7B shows describes graphically the mathematical dynamics of a flying Disc. FIG. 7B shows the mathematical free body diagram (FBD) of the flying disc to show how the disc is able to sustain a level flight and also produce lift. With regards to Gyroscopic Inertia, spin has been shown to have little effect on the aerodynamics of a Frisbee but it does have a critical role in the flight dynamics. Although the lift and drag coefficients are unaffected by spin and the pitch and roll moments are affected but only by a very small amount (Potts and Crowther, 2002), the critical aspect of the spin is the stability it provides in flight due to angular momentum and gyroscopic precession. Angular Momentum $H=I\omega$.

TABLE 1

Moments of inertia for a Frisbee (experimentally determined) and a flat disc of equal mass

| | Frisbee (kg-m$^2$) | Flat Disc (kg-m$^2$) | Difference |
|---|---|---|---|
| $I_{zz}$ | 0.00235 | 0.0016 | 47% |
| $I_{xx}, I_{yy}$ | 0.00122 | 0.0008 | 53% |

The moment of inertia of disc is given by ½ mr$^2$ and a ring is mr$^2$.

FIG. 7B illustrates exemplary an angular momentum vector H 70, at some initial time, t, and a later time, t+dt due to the rate of change of H. View from back of Frisbee with the velocity vector into the page, and a negative pitch moment directed to the left. Rather, for $\alpha<9°$, the Frisbee will roll to the right. This occurs because the change in the angular momentum is equal to the moment, H&=M, meaning that the angular momentum vector must rotate towards the direction of the moment. In this case, the moment is pointed to the left, so is to the left, and as the angular momentum vector rotates to the left, the left side of the Frisbee will rotate to the right. Thus a negative pitching moment will cause the disc to roll right while a positive pitching moment will cause the disc to roll left. Likewise, a negative roll moment (vector points back) will cause the front of the disc to nose down, while a positive roll moment will cause the Frisbee to pitch up. In general, a pitching moment causes processional roll rate and a roll moment causes a processional pitch rate. This important aspect of the spin is critical to understanding the dynamics of stable flight. Previously it was mentioned that an increase in H, specifically the magnitude of the axial component, Hz, will reduce the effects of precession.

FIG. 7A (C) illustrates exemplary free body diagram, moments associated with the gyroscopic torques generated. Positive pitch motion (aerodynamic lift force, etc.) generates a positive rolling gyroscopic torque: $\tau_{gx}=I_d\theta'_d\Omega_d$ Positive roll motion generates a negative pitching gyroscopic torque: $\tau_{gy}=-I_d\varphi'_d\Omega_d$ According to the left paper, a quadrotor with a tip-to-tip wingspan of 55 cm, a height of 8 cm, and a weight of about 500 grams including a battery has corresponding thrust coefficient of kf=6.11*10^-8. N/rpm^2, torque coefficient of km=1.5*10^-9 Nm/rpm^2. Propeller angular velocities are limited to be 1200 rpm and 7800 rpm. A simple calculation of thrust and torque:

1) 6.11*10-8*70002=2.9939—Maximum thrust, unit: N
2) 1.5*10-9*70002=0.0735—Maximum counter torque, unit: Nm, from each of the four propellers. Counter torque due to propeller rotation is weak, counter torque due to the spinning of the disc needs verification.

Intertia $I_d$=mr$^2$=0.5 kg/0.18$^2$ m$^2$=0.0016 kgm$^2$
Aerodynamic Lift Moment $\tau_L=f_L\times d$=1N×0.15 m=0.15 N×m
Moment balance: $\tau_{gy}+\tau_L=0$
$\tau_L=I_d\times\varphi_d\times\Omega_d$, assuming $\varphi_d$=30 deg/s=0.5236 rad/s
Therefore, required disc speed is $\omega_d$=179 rad/s=1710 rpm
The disc accelerates from 0 to 200 rad/s in 10 sec, and then keeps spinning at the speed. Angular acceleration of the disc is $\alpha$=200/10 20 rad/s$^2$.
Disk torque: $\tau d=Id*a$=0.0016*20=0.03 Nm, which can be balanced by the quadcopter propellers. If the counter torque from the props is too small to balance the disc torque, we can apply slower disc acceleration.

Figure 8:
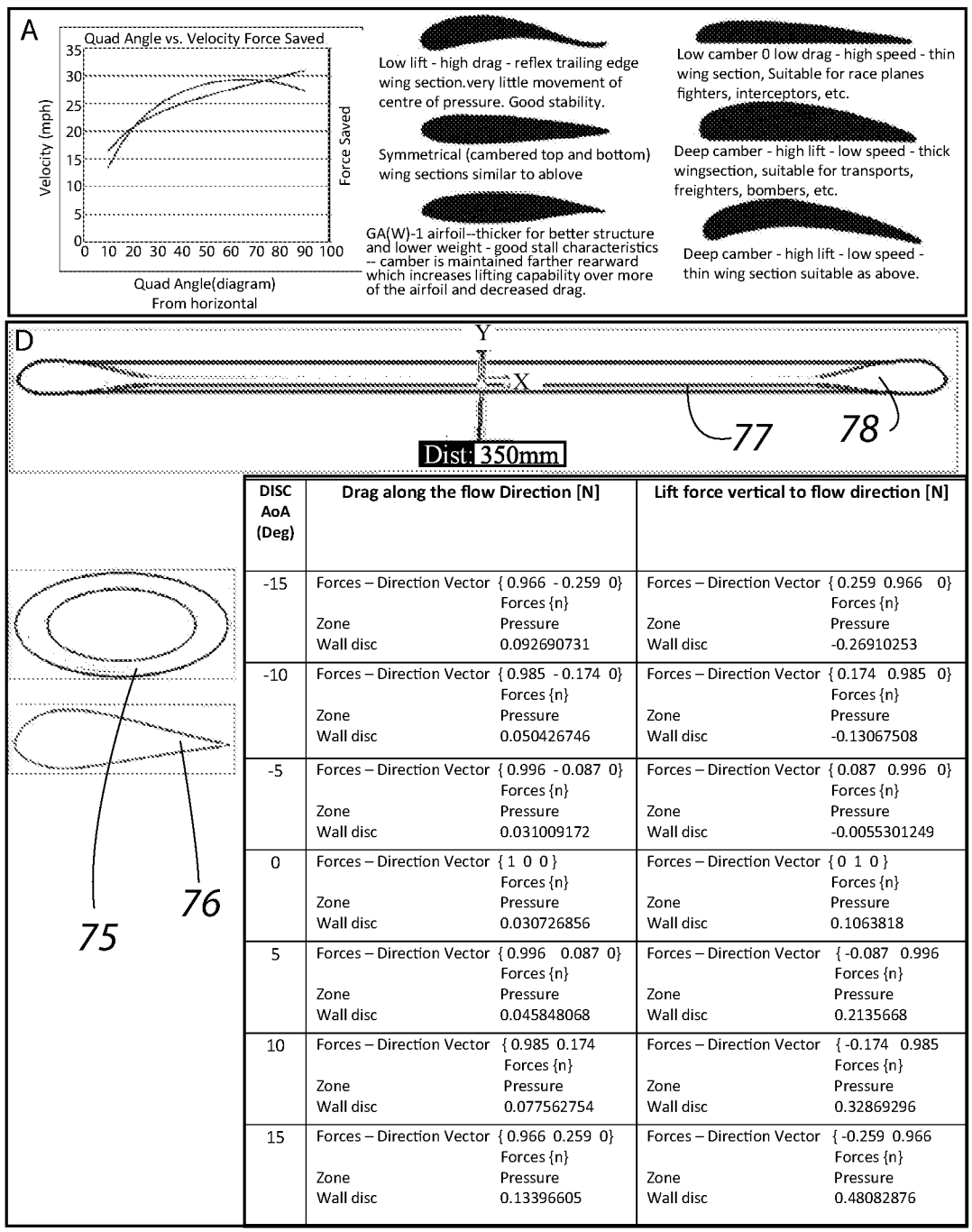
FIG. 8 shows various airfoils that are swept to make exemplary styles of discs that constitute an exemplary arrangement of the drone.

FIG. 8 illustrates exemplary flight dynamics of a flying disc. The flying Disc shape can be of various forms and can be adapted to the flight conditions, speed of flight through air and portability and size of the disc, disc loading. Further, illustrated are various exemplary airfoils can be used for defining the shape of the disc (Figure A). 75 illustrate a proposed ring designs (Frisbee), in accordance with an embodiment of the present disclosure. Figure DD shows CFD analysis for disc Swept from Eppler 379 Airfoil, in accordance with an embodiment of the present disclosure. =The data shows the Lift (L) and Drag (D) at various angles of pitch of the disc through the oncoming air. Various airfoils are tested to produce the best one fit for the application to allow correct performance (mission based). F different angles of the Rotary flying vehicle will shift the center of lift and hence cause the disc to settle to a different natural angle.

FIG. 11 In an exemplary embodiment, in addition another kind of aerial advertising scheme can be used such that a blimp has a surface (flat or curved) which is used to project images/graphics from a projector (DLP, LCD, LCoS, etc. technologies), which use a lamp, or led or laser as the illuminating source. Again, this disclosure does not claim anything on technologies used in conventional projectors (whether tabletop, pocket, carry-on or on mobile/portable devices), however it does claim the idea and processes of using a projector to project/display graphics/images 116 on a surface, while that surface is either the wall of a blimp (curved or flat 116) and the blimp is flying in air 117.

One more application can be of Aerial Advertising, discussion of such was carried out in patent application number/Ser. No. 15/264,455 (Methods and Devices for using Aerial Vehicles to Create Graphic Displays and Reconfigurable 3D). In the application, the Gas chamber is enclosed in a spinning LED mechanism to display graphics using the property of persistence of vision.

In addition another kind of aerial advertising scheme can be used such that a blimp has a surface (flat or curved) which is used to project images/graphics from a projector (DLP, LCD, LCoS, etc. technologies), which use a lamp, or led or laser as the illuminating source. Again, this patent does not claim anything on technologies used in conventional projectors (whether tabletop, pocket, carry-on or on mobile/portable devices), however it does claim the idea and processes of using a projector to project/display graphics/images on a surface, while that surface is either the wall of a blimp (curved or flat) and the blimp is flying in air. The invention claims priority on the drone which carries both the projected surface and the projector on the same blimp. One such arrangement is as follows, in which a blimp carries a projector internally and the projector, displays graphics on the surface of the blimp from the inside, but in the case where such a balloon is a flying drone and is filled with lighter than air gas.

Various configurations of the flying projector blimp may be possible, one such embodiment is as shown below, but a different arrangement may involve the use of a 360 degree or a 180 degree lens to project the graphics on a portion or the blimp or the full surface of the blimp. Such projection may be used for camouflaging the flying balloon by matching the projected graphics colors to that of the surroundings or the background. The discussion of camouflage was also done in the patent filed by the author (U.S. application Ser. No. 15/264,455).

The projection can be on the entire surface of the blimp thereby making the graphics visible from one or more sides of the balloon, and in another embodiment graphic can be visible from all sides of the blimp.

The blimp can also have a different shape than a spherical or spheroidal shape. It can have one side or multiple sides be flat or a combination of flat and curved surfaces, wherein the projector would display the graphics on the flat side of the blimp or the curved or both.

The blimp would be able to fly like the blimps described in this patent but will have the utility of aerial displays. Such displays can be used for broadcasting videos, pictures, advertisements, movies and more.

The patent does not claim priority to the use of spherical objects for projection of graphics; however it takes priority on the use of a projector, a projection film/surface and the light source towards use on a blimp. i.e. all components of the projection system are embodied on or inside the blimp, or the blimp is constructed to encapsulate all those elements towards making a graphics displaying flying drone or flying blimp drone.

Such a blimp may have their power source onboard or tethered from the ground for power and harnessing purposes, but must be allowed to maneuver in 3D space.

This patent also covers the use of various shapes of blimps, types of projection electronics, lenses, sensors, light emitting sources, etc. all used for the end goal of having a floating/flying aerial drone or a drone blimp used for aerial graphics displays, wherein all the listed parts are flying along with the blimp as well.

Patent does not claim priority on the kind of flight control, sensor package, mapping, etc payloads the blimp may carry, as long as it has the bare essential elements to fly like a projector blimp drone (i.e. power source, projector, surface to be projected on, lighter-than-air mixture of gasses, a chamber/container to hold the gasses, a propulsion mechanism for maneuvering and a flight control system).

The blimp may receive the graphics from the ground, or wirelessly or through a tether, but methods and ways of sending data/graphics to the blimp are outside the scope of this patent.

An exemplary arrangement a blimp carries a projector internally and the projector displays graphics on the surface of the blimp from the inside, but in the case where such a balloon is a flying drone and is filled with lighter than air gas.

Various configurations of the flying projector blimp may be possible, one such embodiment is as shown below, but a different arrangement may involve the use of a 360 degree or a 180 degree lens to project the graphics on a portion or the blimp or the full surface of the blimp. Such projection may be used for camouflaging the flying balloon by matching the projected graphics colors to that of the surroundings or the background. The discussion of camouflage was also done in the patent filed by the Applicant (Ser. No. 15/264,455).

The projection can be on the entire surface of the blimp thereby making the graphics visible from one or more sides of the balloon and in another embodiment graphics can be visible from all sides of the blimp.

The blimp can also have a different shape than a spherical or spheroidal shape. It can have one side or multiple sides may be flat or a combination of flat and curved surfaces, wherein the projector would display the graphics on the flat side of the blimp or the curved or both.

The blimp would be able to fly like the blimps described in this patent but will have the utility of aerial displays. Such displays can be used for broadcasting videos, pictures, advertisements, movies and more.

In an exemplary embodiment, the present disclosure does not claim priority to the use of spherical objects for projection of graphics; however it takes priority on the use of a projector, a projection film/surface and the light source towards use on a blimp. i.e., all components of the projection system are embodied on or inside the blimp, or the blimp is constructed to encapsulate all those elements towards making a graphics displaying flying drone or flying blimp drone. Such a blimp may have its power source onboard or tethered from the ground for power and harnessing purposes, but must be allowed to maneuver in 3D space.

In an exemplary embodiment, covers the use of various shapes of blimps, types of projection electronics, lenses, sensors, light emitting sources, etc.; all used for the end goal of having a floating/flying aerial drone or a drone blimp used for aerial graphics displays, wherein all the listed parts are flying along with the blimp as well.

In an exemplary embodiment, the present disclosure does not claim priority on the kind of flight control, sensor package, mapping, etc. payloads the blimp may carry, as long as it has the bare essential elements to fly like a projector blimp drone (i.e. power source, projector, surface to be projected on, lighter-than-air mixture of gasses, a chamber/container to hold the gasses, a propulsion mechanism for maneuvering and a flight control system).

In an exemplary embodiment, according to the present disclosure. The blimp may receive the graphics from the ground, or wirelessly or through a tether, but methods and ways of sending data/graphics to the blimp are outside the scope of this application.

Figure 9A:
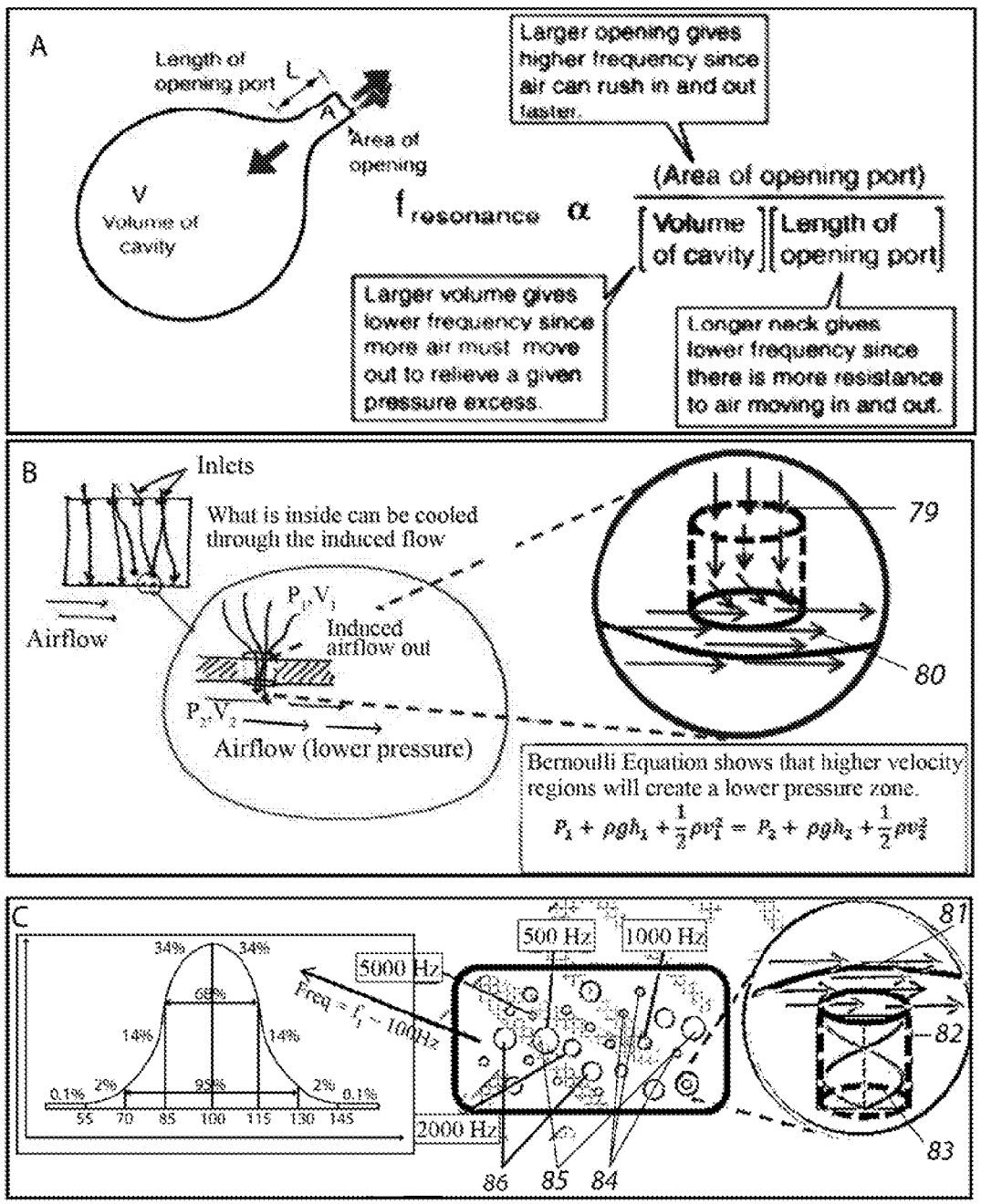
FIG. 9A shows Venturi effect on the surface of the Drone causing air circulation and pressure waves (such as sound).

FIG. 9A shows Venturi effect on the surface of the Drone causing air circulation and pressure waves (such as sound). In an embodiment, use of cavities 82 and orifices 79 on airflow exposed surfaces such as those on air vehicles, fans, cars, motors etc. which are normally closed or encapsulated in covers; towards the purposes of Cooling, Noise Canceling, Sound Generation, Air Flow improvement for the object at hand. Current closed electronic and mechatronic systems often suffer from overheating of electric and mechatronic components, leading to need for additional cooling elements like heat-sinks, cooling fans, liquid cooling and more components causing weight increase and/or drag to objects moving through air. Electronics and electro-mechanical objects and products can also produce sound and noise which leads to deterred adoption in spaces including military/covert usage, consumer electronics in homes and noise sensitive environments. All these issues drain a lot of flight power for the flying vehicle. The use of Orifices can aid in the generation and/or cancelation of sounds/noise to increase performance, reduce impact on surroundings and make use of the negative space (due to lack of material) leading to negligible or no weight increase to the extent of weight decrease. The same orifices implanted with a seal or "Lid" (97) can generate better air grasping and vortex generation on flying vehicles leading to improvement in stall speeds and aerodynamics, while dynamically and passively can adjust to changing relative air velocities.

Figure 9B:
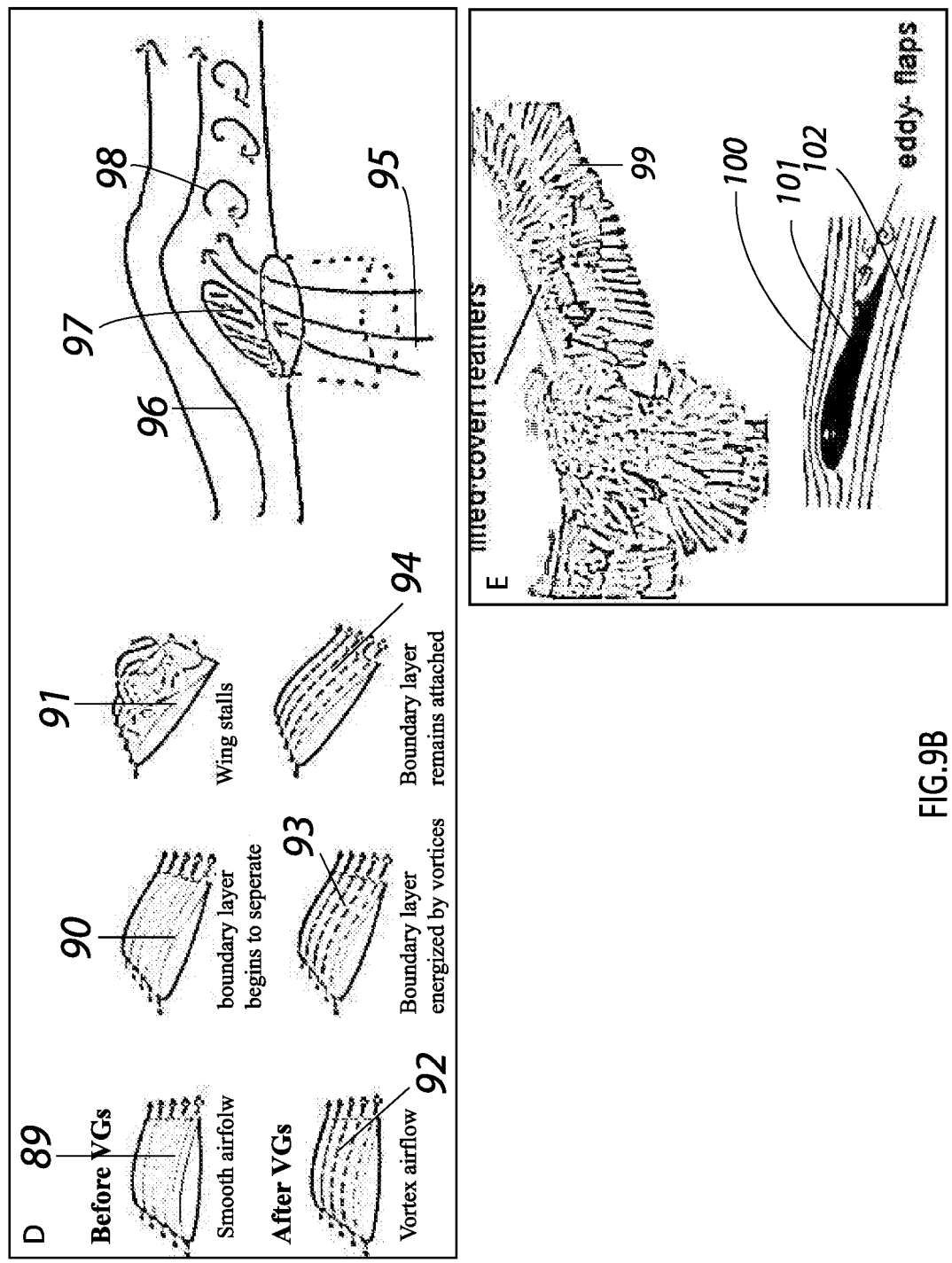
FIG. 9B shows Vortex Generation due to valves on the surface of the flying vehicle.

FIG. 9B exemplary net flow created through a pipe by Venturi effect according to Bernoulli equation. The Venturi effect creates a net flow through a pipe with an opening across which a fluid is moving, the application is very useful in cooling flying vehicles or products which encounter airflow around them in normal operation (such as fans, cars, etc.) with closed bodies which house motors, electronics and heat generating parts. If constructed correctly, a network of holes on the skin of a flying vehicle or part/product interfacing with airflow could induce airflow through the body of the vehicle, or part/product, creating a cooling effect within the closed system or part, allowing for closer-constructed electronics without requiring bulky, heavy cooling apparatus or add-ons which either increase weight or add drag to the overall system in air, not to mention increased Bill of Materials (BOM) and cost.

Cavity resonance, similar to the Venturi effect, arises from flow over a closed pipe (or a Blind hole Figure A). This can be applied to a body moving through a fluid to produce a variety of effects. Might be best imagined on a craft moving through air and producing sound vis-à-vis the presence of Blind holes.

a. Generating a specific tone, akin to the signature noise on high-end production cars or sports cars/motor-bikes and other objects.

b. Creating near-white noise, in order to alleviate the intensity of the well-known whine of electronics, engines and other noise producing mechanisms and parts (good example is to use the technology on aircrafts to reduce engine noise. Or reduce the signature of military vehicles and air vehicles and Remote Controlled Toys, Drones and aircraft.

c. Eliminating noise by exactly cancelling the frequency arising from the actuators of Drones, aircrafts, vehicles in general and other consumer/commercial/military products by adjusting the cavity generated sound to be phased opposite to the phase of the noise to be cancelled.

d. Producing other sonic waves of interest for the general health and efficiency of motion through the air.

A collection of small "cavities" (84, 85, 86) of different dimensions may be able to resonate (shown as standing waves 83) creating a profile of frequencies to cover a certain frequency spectrum, wherein the bell curves 88, 87 can be overlapped to cover a spectrum of frequencies. Figure A illustrates exemplary the equation involved with oscillation of air in and out of a cavity that determines the resonant frequency.

As shown in FIG. 9B, if a hinged lid is attached to the holes on the Air exposed part of an object, such as on an aircraft, the Venturi effect can lift them as shown in 97, transforming them into vortex 98 generators (VGs), allowing for better low-speed maneuverability, reduced stall speeds, and higher stability in lower speed flights. At higher velocities, the lids would be pushed back down by dynamic pressure from the now, while still allowing for the Venturi effect to draw air out. However on lower velocities the lids would both be useful for internal cooling and generating vortices for superior flight same can be extended to ground and water vehicles which require aerodynamic stability or can benefit from it. The use of orifices on the body of the aircraft can in effect lead to improved aerodynamics at low speed. 95, 96, 97, 98 illustrate the effect of vortex generators and same on wings 99, 101.

FIG. 9B, This (99) illustrates the lifted feathers of this bird prevent airflow separation, allowing higher maneuverability at lower speeds. This (99) shows a similar but not identical example which comes from Nature as shown on the wings of predatory birds which use similar phenomenon during low speed maneuvers nearing stall conditions for the wings. However the birds use a more complex mechanism but research in the area show use of small projections on surfaces of bird's wings to improve low speed aerodynamics for stall conditions as shown through similar vortices.

Figure 10:
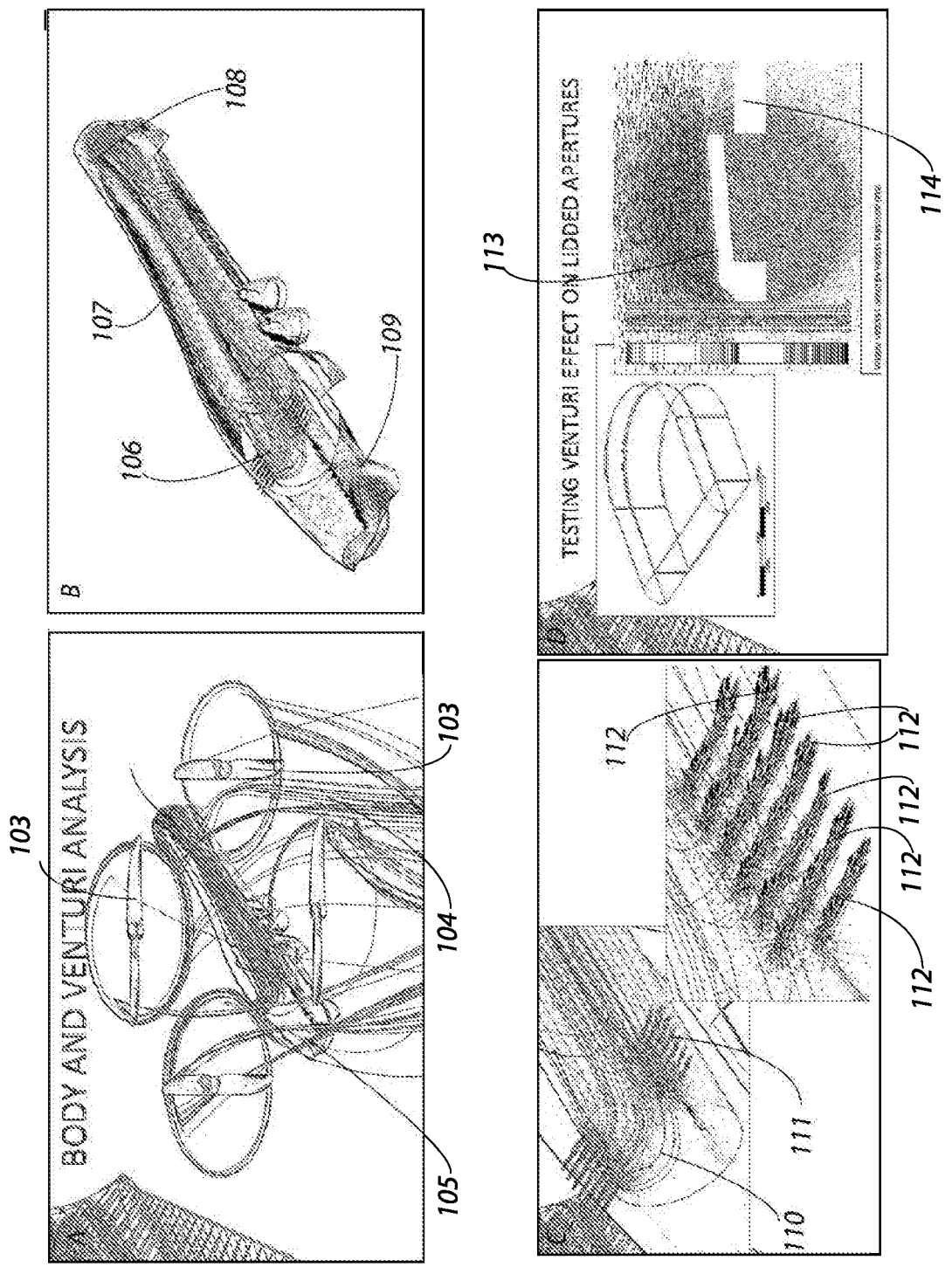
FIG. 10 illustrates how internal air circulation occurs by the use of vents, holes, valves on the surface of the flying drone.

FIG. 10 show the extension of the concepts talked about in FIG. 9B, where in the circulation of air through the body of the drone is shown and how it's facilitated by the use of lids 113. The Air intake is from the 112 orifices and is shot out the back of the drone 108. The venture analysis of an exemplary configuration of the drone Figure A shows the flow of air currents due to air wash produced by the propellers and incoming air movement across the surface of the drone 114.

To summarize the proposed invention according to the present disclosure, the use of orifices and cavities on the surfaces of air exposed vehicles (such as drones, aircrafts, cars etc.) and on products and parts can utilize Venturi effect, along with Cavity Resonance and Vortex Generation, can all be applied to improve performance of systems with relative ease, to vastly improve its capabilities and increase the efficiency of its operation. The aforementioned method of shutting off motor power is able to increase the overall efficiency and/or flight time for multi-rotors. Leveraging internal fluid dynamics analysis and existing forward-flight aircraft knowledge, results have proven to be effective. Shaping the airfoils around drones to be circularly swept makes the flying vehicle direction invariant to cross-winds and aids lift from various directions by cross-winds. Additionally providing gyroscopic stability to the flying vehicle. By combining these two technologies, it is possible to greatly increase the effectiveness of both and lend extension of applications not seen before. There are other aerodynamic benefits in spinning aerodynamic surfaces which can help provide additional lift and reduce energy consumption by moving to "fixed-wing like" flight for the Rotary Propulsion drone/toy.

The proposed invention can be extended to other objects which may not fly such as portable televisions and other ground based products and consumer electronics. The use of blimp based drones can greatly improve the applications and increase performance for drones through higher endurance, greater payload, more stable pictures—videos and many more advantages. Some of the other drone configuration is included in the attached documents to this main application.

Additional Applications

In an example, following can be the customers for the proposed invention:

Educational applications—school education:
This drone is capable of flying for an entire class, which
Safety—no spinning blades that could hit children
Telepresence/VR—Virtual field trips/tours
Can be Incorporated in lessons to become part of the subject matter
Robotics education and other educational divisions in schools.
Planetary Exploration: On MARS for exploration on the surface, canyons, mountains
Other planets with atmosphere where a blimp can reasonably fly and provide information, data, perform operations including but not limited to moving, lifting or gathering.
NASA is already developing drones for this. The information can be found at link http://www.ipl.nasa.gov/news/news.php?feature=4457
Atmospheric density is a challenge for copters on Mars
Indoor Applications
Misting operations (for plants, plant nurseries, other areas requiring misting to support moisturizing)
Bug spraying or fumigation or misting
Janitorial applications
Mobile air cleaning, air filtration (which may include, but not limited to filters using HEPA filters or other kinds of air filters)
Inspections
Greenhouse Duties
Spraying to prevent disease and pests
Plant watering
Tours
Guided tours around a museum
Tours around a facility
Guided navigation to a particular room in a building
Others application can include the ones discussed earlier in the document and at other places.

Although the proposed system has been elaborated as above to include all the main modules, it is completely possible that actual implementations may include only a part of the proposed modules or a combination of those or a division of those into sub-modules in various combinations across multiple devices that can be operatively coupled with each other, including in the cloud. Further the modules can be configured in any sequence to achieve objectives elaborated. Also, it can be appreciated that proposed system can be configured in a computing device or across a plurality of computing devices operatively connected with each other, wherein the computing devices can be any of a computer, a laptop, a smartphone, an Internet enabled mobile device and the like. All such modifications and embodiments are completely within the scope of the present disclosure.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

What is claimed is:

1. An Unmanned Aerial Vehicle (UAV), comprising:
a propulsion system of the UAV, comprising at least one of fixed wings, flapping wings, and rotary blades, and propellers;
a payload comprising at least an electronic control system to maneuver or pilot the UAV;
at least one of a power source onboard in the form of stored power onboard in the form of a battery or fuel, a power gathering source in the form of a solar panel or wind energy generator, a power delivery source in the form of a tether cable, or wireless energy transfer through EM radiation;
a communication system to communicate with the UAV to exchange data and instructions;
and a gas chamber that is externally connected to the UAV using connecting structure, to allow removal of the gas chamber and connect a different shaped gas chamber, wherein the gas chamber is adapted to hold a gas for buoyancy purposes to reduce a net effective Gross Take Off Weight of the UAV, wherein the UAV requires the gas chamber for flying.

2. The vehicle of claim 1, wherein a Three Dimensional (3D) shape of the gas chamber is a closed geometrical shape formed in 3D using basic Two Dimensional (2D) geometries and extruding them or sweeping them about a One dimensional (1D) axis.

3. The vehicle of claim 2, wherein the air chamber comprises a gas having density less than that of air, or a combination of gasses having a net density less than that of air.

4. The vehicle of claim 3, wherein the air chamber configured to have different size and shape configurations.

5. The vehicle of claim 4, which is configured to use onboard or off-board artificial intelligence (AI) to take real-time actions upon detection of real-time events.

6. The vehicle of claim 5, wherein the gas chamber is transparent to an extent, or colored or camouflaged with the surroundings.

7. The vehicle of claim 6, wherein a surface of an external surface of the gas chamber has solar cells for absorbing ambient light and converting it to electricity to supply operational power and for storage.

8. The vehicle of claim 7, wherein the gas chamber is designed in a tubular form or a donut form.

9. The vehicle of claim 8, wherein an inner void of the tubular gas chamber has a breathable net or mesh, which allows air to pass through, but limits objects of a minimum size from passing through.

10. The vehicle of claim 9, which configured to be used to transmit live video to a remote location or a display unit.

11. The vehicle of claim 10, which configured to be used to play games in the air by coordinating a set of movements with a remote controller.

12. The vehicle of claim 8, wherein the electronic control system and propulsion system are environmentally proofed to allow operation on a surface of water and also in damp environmental conditions.

13. The vehicle of claim 11, wherein the UAV is configured to land and take off from a surface of water, land or ice.

14. The vehicle of claim 12, wherein the payload consists of sensors for remote monitoring, automatically, manually or a combination of the two.

15. The vehicle of claim 13, wherein the gas chamber is streamlined to minimize air drag and has external fins to passively maintain its least drag orientation while traveling through air or while encountering oncoming air.

16. The vehicle of claim 14, wherein pan of the gas chamber has a display screen, wherein an internal projection unit casts graphics on an inner surface of the gas chamber to form an aerial display unit, wherein the display screen is viewable from outside of the gas chamber.

17. The vehicle of claim 15, wherein the Gas chamber is enclosed in a spinning LED mechanism to display graphics using the property of persistence of vision.

18. The vehicle of claim 16, wherein the gas chamber is configured to be replaced with an aerodynamic donut shaped ring made of a swept 2D airfoil to provide lift when moving through air or when air is inbound towards the Drone.

19. The vehicle of claim 18, comprising:
at least one surface exposed to external air is laden with at least one or more cavities or holes or vents or valves, wherein the surface of the vehicle has air moving relative to the surface, and the air moving over the vehicle surface moves in and out of the at least one or more cavities or holes or vents or valves and causes differential pressures and velocities across the one side of the surface and the another side of the surface.

20. The vehicle of claim 19, where in the valves open outwards when the air velocity is higher on the outer surface of the vehicle than the inner surface, thereby generating vortices.

21. The vehicle of claim 20, where in the valves or holes or vents cause air to circulate between the inside of the body of the vehicle and the outside air.

22. The vehicle of claim 21, wherein the cavities on the surface of the vehicle produce sound or high frequency waves.

* * * * *